US008405910B2

(12) United States Patent
Kashiwagi et al.

(10) Patent No.: US 8,405,910 B2
(45) Date of Patent: Mar. 26, 2013

(54) OPTICAL SHEET, IMAGE SOURCE UNIT, DISPLAY DEVICE, PROCESS FOR PRODUCING OPTICAL SHEET, AND METHOD FOR MANUFACTURING DISPLAY DEVICE

(75) Inventors: Tsuyoshi Kashiwagi, Tokyo-to (JP); Takayuki Niijima, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 13/038,730

(22) Filed: Mar. 2, 2011

(65) Prior Publication Data
US 2011/0146904 A1    Jun. 23, 2011

Related U.S. Application Data

(62) Division of application No. 12/678,180, filed as application No. PCT/JP2008/067302 on Sep. 25, 2008.

(30) Foreign Application Priority Data

Sep. 25, 2007 (JP) ................................. 2007-247167
Sep. 25, 2007 (JP) ................................. 2007-247917

(51) Int. Cl.
*G02B 27/10* (2006.01)
*G03B 21/60* (2006.01)
(52) U.S. Cl. .......................... 359/625; 359/454; 359/618
(58) Field of Classification Search .................. 359/625, 359/618–621, 262, 443, 454–455; 264/1.1, 264/1.32, 2.7
See application file for complete search history.

(56) References Cited

U.S. PATENT DOCUMENTS

| 6,266,121 | B1 * | 7/2001 | Shigeta et al. ................ 349/156 |
| 2006/0145578 | A1 * | 7/2006 | Park et al. ..................... 313/112 |
| 2006/0245064 | A1 | 11/2006 | Sasaki | |
| 2006/0286371 | A1 | 12/2006 | Kim et al. | |

(Continued)

FOREIGN PATENT DOCUMENTS

| JP | 64-019301 A | 1/1989 |
| JP | 2000-347010 A | 12/2000 |

(Continued)

OTHER PUBLICATIONS

USPTO OA mailed May 25, 2011 in connection with U.S. Appl. No. 12/678,180.

(Continued)

*Primary Examiner* — Dawayne A Pinkney
(74) *Attorney, Agent, or Firm* — Ladas & Parry LLP

(57) ABSTRACT

There is provided: an optical sheet, which has excellent productivity while maintaining an optical performance and can reduce a manufacturing cost; an image source unit; a display device; a method for producing an optical sheet; and a method for manufacturing a display device.
An optical sheet 10 is disposed on an observer side relative to an image source and comprises a plurality of layers that control light emitted from the image source to emit the light on the observer side, wherein at least one of the plurality of layers is a base material layer 16; one layer disposed on one side of the base material layer is an optical functional sheet layer 11, which comprises prisms 12 being arranged in parallel along the sheet surface of the optical sheet whereby light can be transmitted and light-absorbing parts 13 being arranged in parallel between the prisms whereby light can be absorbed; one layer disposed on the other side of the base material layer is an adhesive layer 17; and an adhesive layer is not provided on a side surface of the optical functional sheet layer facing the side disposed with the base material layer.

6 Claims, 19 Drawing Sheets

U.S. PATENT DOCUMENTS

| | | |
|---|---|---|
| 2007/0152555 A1 | 7/2007 | Park et al. |
| 2007/0182874 A1 | 8/2007 | Kamijima |

FOREIGN PATENT DOCUMENTS

| | | |
|---|---|---|
| JP | 2002-189106 A | 7/2002 |
| JP | 2003-004904 A | 1/2003 |
| JP | 2004-004148 A | 1/2004 |
| JP | 2004-062084 A | 2/2004 |
| JP | 2005-084477 A | 3/2005 |
| JP | 2006-084876 A | 3/2006 |
| JP | 2006-189867 A | 7/2006 |
| JP | 2006-201577 A | 8/2006 |
| JP | 2006-350324 A | 12/2006 |
| JP | 2007-183645 A | 7/2007 |
| JP | 2008-096686 A | 4/2008 |
| KR | 1020030080116 A | 7/2006 |

OTHER PUBLICATIONS

Japanese Office Action dated Feb. 28, 2012: Patent Application No. 2007-247917.

* cited by examiner (S11)

(S12)

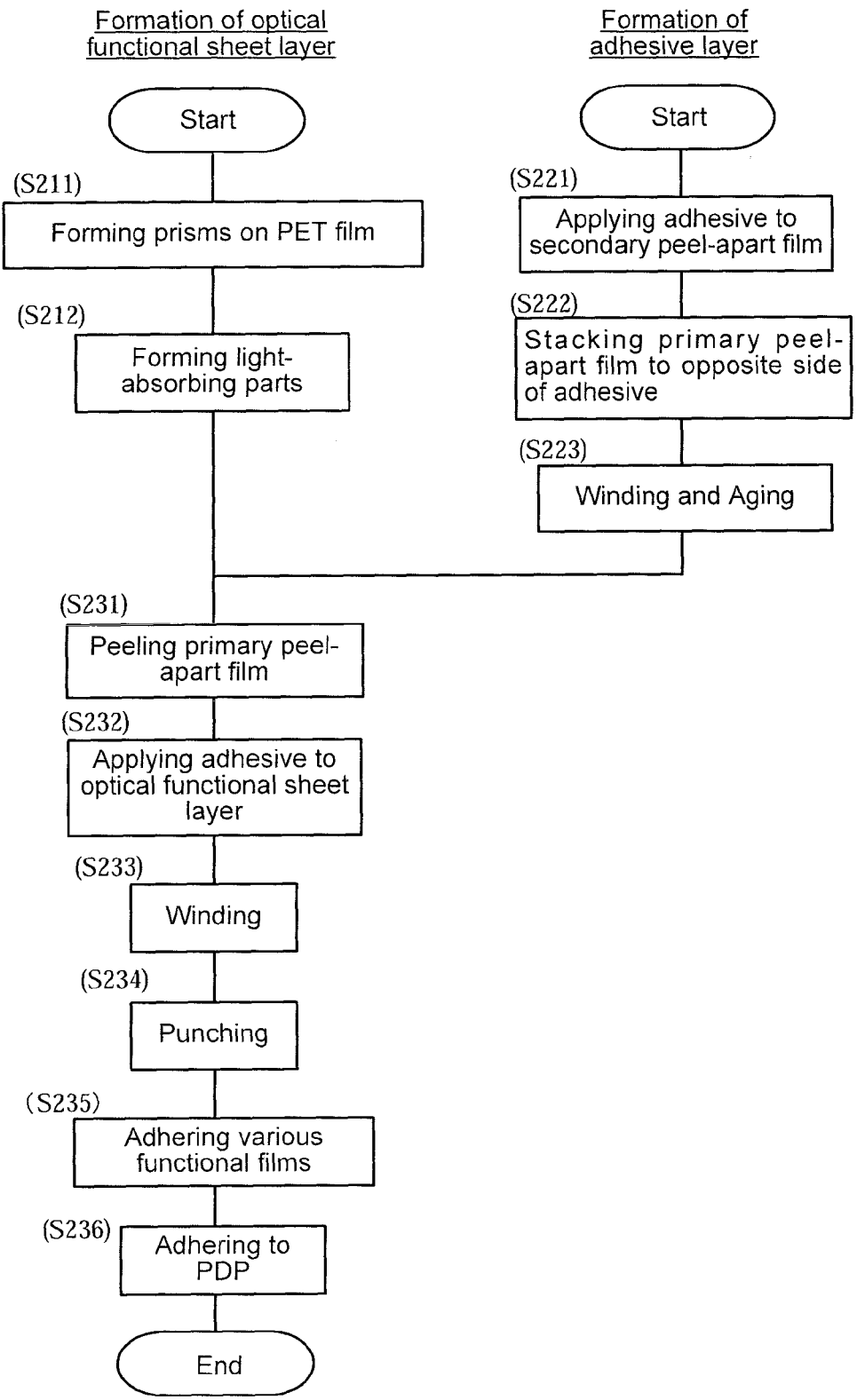

OPTICAL SHEET, IMAGE SOURCE UNIT, DISPLAY DEVICE, PROCESS FOR PRODUCING OPTICAL SHEET, AND METHOD FOR MANUFACTURING DISPLAY DEVICE

TECHNICAL FIELD

The present invention relates to: an optical sheet, which is disposed on an observer side relative to an image source and can suitably control image light and external light; an image source unit; a display device having an image source, such as a plasma television; a process for producing an optical sheet; and a method for manufacturing a display device. More particularly, the invention relates to: an optical sheet, which has excellent productivity and can reduce the manufacturing cost, an image source unit; a display device having an image source, such as a plasma television; a process for producing an optical sheet; and a method for manufacturing a display device.

BACKGROUND ART

Recently, instead of a conventional CRT-based television, a television having a plate-shaped image source increases in number. As the image source, for example, a plasma display panel may be used.

For example, a plasma television includes, in its housing: a plasma display panel (hereinafter, it may be referred to as "PDP".) as an image source, an optical sheet, and various optical films. The optical sheet and various optical films serve to provide an observer with a high quality image. Especially, the optical sheet therefore includes prisms and light-absorbing parts (see Patent Document 1.), wherein the prisms are arranged in parallel along the sheet surface of the optical sheet and transmit therethrough image light from the PDP, and the light-absorbing parts are provided between the prisms and suitably block or reflect image light and external light to improve a contrast or to control ghost.

Recently, in terms of, for example, thinning of a plasma television, in many cases an optical sheet is adhered to a PDP directly or through a certain layer (a direct application method) (see Patent Document 2.). In that case, the provided display device includes: an optical sheet; and an adhesive layer for adhesive purpose, wherein, for example, a display device may comprise an optical sheet 220 having a layer structure as shown in FIG. 18. Namely, an adhesive layer 227, an optical functional sheet layer 221, and a PET film layer 226 are stacked in the order from the PDP 211 side (the left side of FIG. 18) toward the observer side (the right side of FIG. 18). The optical functional sheet layer 221 includes the prisms 222 and the light-absorbing parts 223.

By the above constitution of the optical sheet 220, the direct adhesion of the optical sheet 220 to the PDP 211 becomes possible.

Patent Document 1: Japanese Patent Application Laid-Open No. 2006-189867
Patent Document 2: Japanese Patent Application Laid-Open No. 2006-350324

DISCLOSURE OF THE INVENTION

Problems to be Solved by the Invention

However, with regard to the display device including the optical sheet 220, particularly in view of the production of the optical sheet 220, the optical sheet 220 and the display device including the optical sheet 220 have been required to be manufactured by a simpler method than ever before. FIG. 19 is a flowchart focusing on an example of a process for producing the optical sheet 220 in a method for manufacturing the display device including the optical sheet 220 and the process until the optical sheet 220 is adhered to a PDP (manufacturing method S210). In the manufacturing method S210, prisms are first formed on a PET film (S211), and light-absorbing parts are then formed between the prisms (S212). According to this constitution, a sheet including an optical-functional sheet layer formed on a base material layer is obtained.

Meanwhile, the manufacturing method S210 has steps S221 to S223 separately from step S211 and step S212. Specifically, an adhesive is applied onto a secondary peel-apart film (S221). Then, a primary peel-apart film which is another peel-apart film is stacked on the surface of the adhesive opposite side from the secondary peel-apart film (S222). This constitution can provide a sheet including the adhesive sandwiched by the two peel-apart films. The sheet is then wound and aged to stabilize the adhesive (S223).

After steps S212 and S223, the optical functional sheet layer formed on the PET film layer and the sheet which will be an adhesive layer are separately provided. In order to combine them, the primary peel-apart film is peeled (S231), and the adhesive layer exposed by the peeling is adhered onto the optical functional sheet layer (S232). Thereafter, the optical sheet 220 is formed through winding (S233) and punching (S234).

Various optical films are adhered to the optical sheet 220 obtained as above (S235), and the optical sheet 220 with various optical films is further adhered to the image output side of the PDP 211 (S236). Finally, the PDP 211 laminated with the optical sheet 220 and the various optical films is assembled in a housing to form a display device. Various optical films are usually adhered in a cut form; these may be adhered in a roll form.

As described above, in the conventional manufacturing method, the two separately produced sheets are combined to form an optical sheet. The primary peel-apart film is required only for the production of the optical sheet 220 and discarded after being peeled.

In view of the above problem, the present invention provides: an optical sheet which has excellent productivity while maintaining an optical performance and which can reduce a manufacturing cost; an image source unit; a display device; a method for producing an optical sheet; and a method for manufacturing a display device.
Means for Solving the Problem Hereinafter, the present invention will be described. In order to make the understanding of the invention easier, the reference numerals of the attached drawings are enclosed in parenthesis, but these by no means limit the invention to illustrated embodiments.

The first aspect of the present invention is an optical sheet (10), disposed on an observer side relative to an image source and comprising a plurality of layers that control light emitted from the image source to emit the light on the observer side, wherein at least one of the plurality of layers is a base material layer (16); one layer disposed on one side of the base material layer is an optical functional sheet layer (11), which comprises: prisms (12) being arranged in parallel along the sheet surface of the optical sheet whereby light can be transmitted, and light-absorbing parts (13) being arranged in parallel between the prisms whereby light can be absorbed; one layer disposed on the other side of the base material layer is an adhesive layer (17); and an adhesive layer is not provided on a side surface of the optical functional sheet layer facing the surface disposed with the base material layer, whereby the above problem is solved.

The second aspect of the present invention is the light-absorbing part (13) of the optical sheet (10) according to the first aspect is configured to show a light absorption performance having a transmittance of 40-70% when measuring the transmittance of a 6 μm thick sheet made only of the material for constituting the light-absorbing part.

The third aspect of the present invention is characterized in that, in a cross section in a sheet thickness direction of the optical sheet (10) according to the first or second aspect, the prism (12) of the optical functional sheet layer (11) has a trapezoidal shape whose long lower base is located at the base material layer (16) side and short upper base is located at the side facing the base material layer side, and the light-absorbing part (13) has a triangular shape whose base is located at the side facing the base material layer side.

The fourth aspect of the present invention is characterized in that, in a cross section in a sheet thickness direction of the optical sheet according to the first or second aspect, the prism (12") of the optical functional sheet layer (11") has a trapezoidal shape whose long lower base is located at the base material layer side and short upper base is located at the side facing the base material layer side, and the light-absorbing part has a trapezoidal shape whose long lower base is located at the side facing the base material layer side and short upper base is located at the base material layer side.

The fifth aspect of the present invention is the optical sheet (10) according to the third or fourth aspect, wherein the oblique line of the trapezoid provided between the upper base and the lower base of the prism (12) has an angle of more than 0° and 10° or less with respect to the normal line of the sheet surface.

The sixth aspect of the present invention is the optical sheet according to any one of the third to fifth aspects, wherein the oblique line of the trapezoid provided between the upper base and the lower base of the prism (12') includes a polygonal line or a curved line.

The seventh aspect of the present invention is the optical sheet (10) according to any one of the first to sixth aspects, wherein the light-absorbing part (13) contains light-absorbing particles (15) with an average particle diameter of 1 μm or more.

The eighth aspect of the present invention is the optical sheet (10) according to any one of the first to seventh aspects, wherein when a material constituting the prism (12) has a refractive index of Np and material constituting the light-absorbing part (13) has a refractive index of Nb, the Np and Nb have a relation of Np≧Nb, and the Np and Nb have a value of 1.49 to 1.56.

The ninth aspect of the present invention is the optical sheet (20) according to any one of the first to eighth aspects, wherein the prism (12, 22) and the light-absorbing part (13) of the optical functional sheet layer (11, 21) each have a predetermined cross section and extend in the longitudinal direction and the two optical functional sheet layers are stacked such that the light-absorbing parts of the two optical functional sheet layers are perpendicular to one another of the longitudinal directions.

The tenth aspect of the present invention provides a method (S10) for producing an optical sheet according to any one of the first to ninth aspects, wherein the process comprises: applying an adhesive on the base material layer (S11); and forming an optical functional sheet layer on the base material layer applied with the adhesive (Sb), whereby the above problem is solved.

The 11th aspect of the present invention provides a display device (31) configured to output an image to an observer side, comprising: an image source (41); and an optical sheet (10) stacked on an image output side of the image source directly or through other layers, wherein the optical sheet has a plurality of layers that control light emitted from the image source to emit the light on the observer side, at least one of the plurality of layers is a base material layer (16), one layer disposed on the observer side of the base material layer is an optical functional sheet layer (11), which comprises prisms (12) being arranged in parallel along the sheet surface of the optical sheet whereby light can be transmitted and light-absorbing parts (13) being arranged in parallel between the prisms whereby light can be absorbed, and one layer disposed on a surface on the image source side of the base material layer is an adhesive layer (17), whereby the above problem is solved.

The 12th aspect of the present invention is characterized in that, in a cross section in a sheet thickness direction of the optical sheet (10) of the display device (31) according to the 11th aspect, the prism (12) of the optical functional sheet layer (11) has a trapezoidal shape whose long lower base is located at the image source side, and short upper base is located at the observer side, and the light-absorbing part has a triangular shape whose base is located at the observer side.

The 13th aspect of the present invention, in a cross section in a sheet thickness direction of the optical sheet of the display device according to the 11th aspect, the prism (12") of the optical functional sheet layer (11") has a trapezoidal shape whose long lower base is located at the image source side and short upper base is located at the observer side, and the light-absorbing part (13") has a trapezoidal shape whose short upper base is located at the image source side and long lower base is located at the observer side.

The 14th aspect of the present invention is the display device according to anyone of the 11th to 13th aspects, wherein the other layers disposed between the image source (41) and the optical sheet (10) comprise a layer (42) that blocks electromagnetic waves and/or a layer (43) that corrects color tone.

The 15th aspect of the present invention is the display device (31) according to any one of the 11th to 14th aspects, further comprises at least one of an antireflection film (45), an antistatic film (44), and an anti-glare film (46).

The 16th aspect of the present invention is the display device (31) according to any one of the 11th to 15th aspects, wherein the light-absorbing part (13) of the optical sheet (10) is configured to show a light absorption performance having a transmittance of 40-70% when measuring transmittance of a 6 μm thick sheet made only of the material for constituting the light-absorbing part.

The 17th aspect of the present invention is the display device (31) according to any one of the 12th to 16th aspects, wherein the oblique line of the trapezoid provided between the upper base and the lower base of the prism (12) of the optical sheet (10) has an angle of more than 0° and 10° or less with respect to the normal line of the sheet surface.

The 18th aspect of the present invention is the display device according to any one of the 12th to 17th aspects, wherein the oblique line of the trapezoid provided between the upper base and the lower base of the prism (12') of the optical sheet includes a polygonal line or a curved line.

The 19th aspect of the present invention is the display device (31) according to any one of the 11th to 18th aspects, wherein the light-absorbing part (13) of the optical sheet (10) contains light-absorbing particles (15) with an average particle diameter of 1 μm or more.

The 20th aspect of the present invention is the display device (31) according to any one of the 11th to 19th aspects, wherein when a material constituting the prism (12) of the optical sheet (10) has a refractive index of Np and a material constituting the light-absorbing part (13) has a refractive index of Nb, the Np and Nb have a relation of Np≧Nb, and the Np and Nb have a value of 1.49 to 1.56.

The 21st aspect of the present invention is the display device according to anyone of the 11th to 20th aspects, wherein the prism (12, 22) and the light-absorbing part (13) of the optical functional sheet layer (11, 21) of the optical sheet (20) each have a predetermined cross section and extend in the longitudinal direction and the two optical functional sheet layers are stacked such that the light-absorbing parts of the two optical functional sheet layers are perpendicular to one another of the longitudinal directions.

The 22nd aspect of the present invention is the display device (31) according to any one of the 11th to 21st aspects, wherein the image source (41) is a plasma display panel.

The 23rd aspect of the present invention is an image source unit (40) comprising: the image source (41); and the optical sheet (10), wherein these are formed integrally and are used for the display device (31) according to any one of the 11th to 22nd aspects, whereby the above problem is solved.

The 24th aspect of the present invention is a method (S20) for manufacturing the display device according to any one of the 11th to 22nd aspects, comprising: applying an adhesive on a base material (S11); forming the optical functional sheet layer on the base material applied with the adhesive (Sb); and adhering the surface applied with the adhesive to the image source directly or through other layers (S19), whereby the above problem is solved.

EFFECT OF THE INVENTION

According to the present invention, relative to the conventional optical sheet, image source unit, and display device, productivity can be improved while maintaining characteristics of an image. Further, the number of members to be used in the manufacturing can be reduced; hence, based on this viewpoint, the cost can be reduced while improving the productivity.

BRIEF DESCRIPTION OF THE DRAWINGS

FIG. 19 is a flow chart showing an example of a method for producing the conventional optical sheet.

Figure 1:
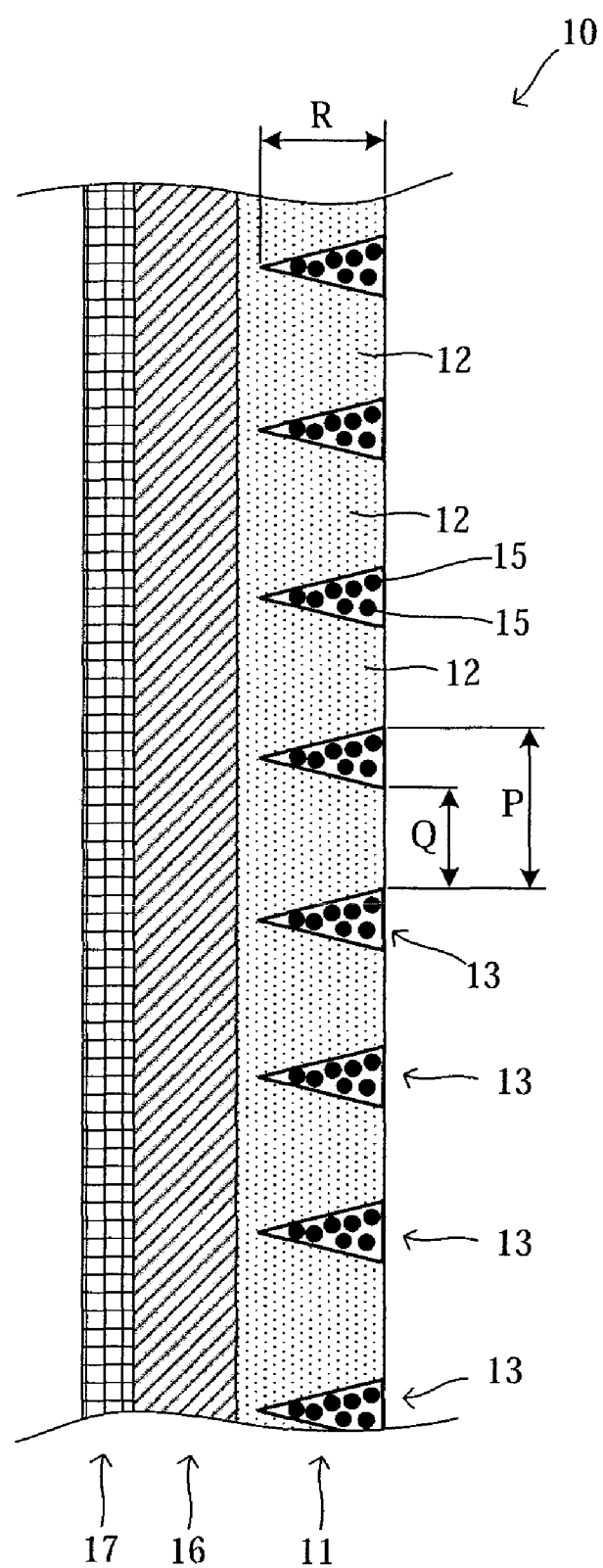
FIG. 1 is a cross-sectional view of an optical sheet according to the first embodiment and shows a schematic layer structure of the optical sheet.

EXPLANATION OF REFERENCE NUMERALS 10, 20 Optical sheet
11, 21 Optical functional sheet layer
12, 22 Prism
13 Light-absorbing part
14 Binder
15 Light absorbing particle
16 PET film layer (base material layer)
17 Adhesive layer
31 Plasma television (display device)
40, 50, 60, 70, 80 PDP unit (image source unit)
41 Plasma display panel (image source)
42 Electromagnetic wave shielding film
43 Toning film
44 Antistatic film (AS film: antistatic film)
45 Antireflection film (AR film: antireflection film)
46 Anti-glare film (AG film: anti-glare film)
61, 81 Glass layer

BEST MODES FOR CARRYING OUT THE INVENTION

The functions and benefits of the present invention will be apparent from the following best modes for carrying out the invention. Hereinafter, the invention will be described based on embodiments shown in the drawings. However, the invention is not limited to the embodiments.

FIG. 1 shows a cross section of an optical sheet 10 of according to the first embodiment of the present invention and shows a schematic layer structure of the optical sheet 10. In FIG. 1, some repeated reference numerals will not be described for viewability (the same holds for the following drawings). The optical sheet 10 comprises: an optical functional sheet layer 11, a PET film layer 16 as a base material layer, and an adhesive layer 17. These layers extend on the far/near side of the drawing while maintaining the cross section shown in FIG. 1. Each layer will be described as follows.

Figure 2:
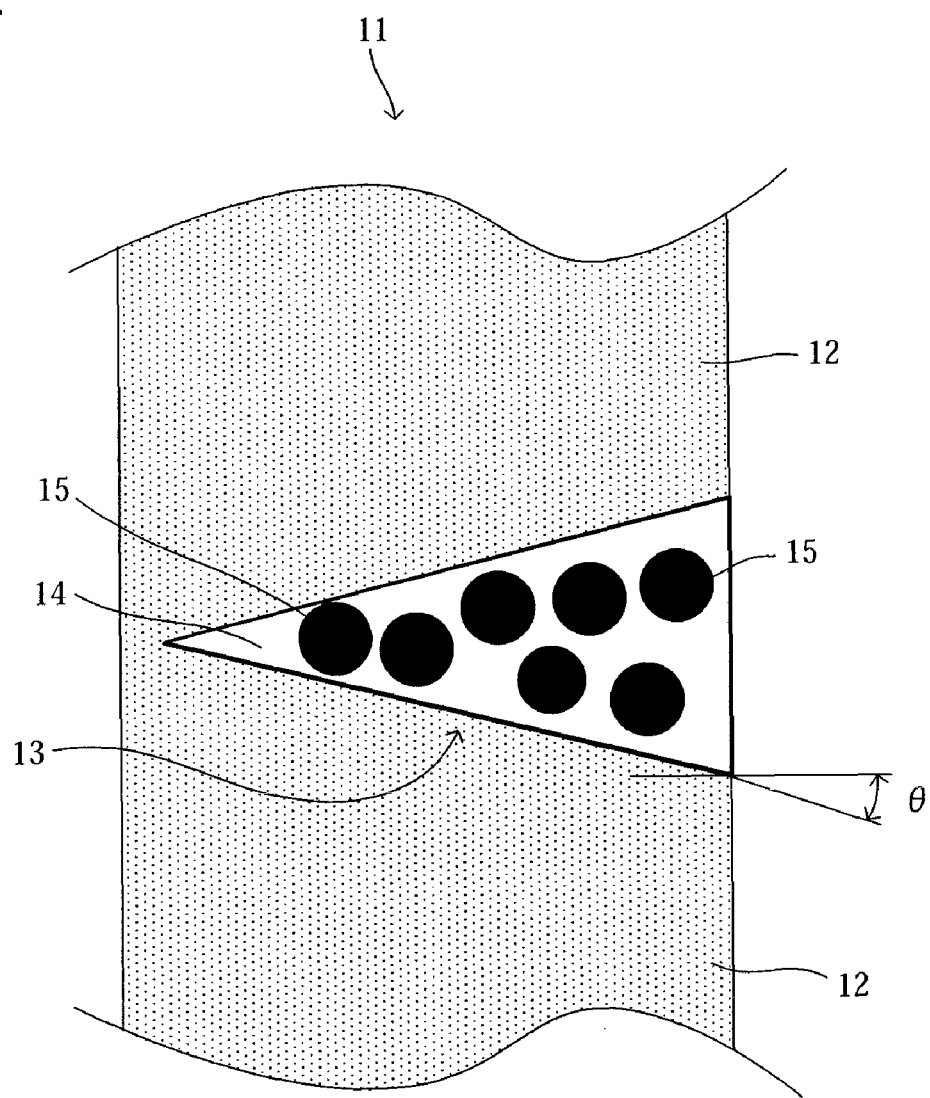
FIG. 2 is a partially enlarged view of the optical sheet of FIG. 1.

The optical functional sheet layer 11 includes prisms 12 and light-absorbing parts 13 arranged between the prisms 12. The prism 12 has a substantially trapezoidal shape in a cross section in a sheet thickness direction of the optical sheet 10. FIG. 2 is a cross-sectional enlarged view focusing on one light-absorbing part 13 and the prisms 12 adjacent to the light-absorbing part 13. The optical functional sheet layer 11 will be described with reference to FIGS. 1 and 2 and other suitable drawings.

The prisms 12 each have a substantially trapezoidal cross section whose long lower base is located at the PET film layer 16 side and short upper base is located at the side facing the lower base. The prisms 12 are each formed of a light transmissive resin with a refractive index of Np. This is usually formed of, for example, epoxy acrylate characterized by being cured by ionizing radiation, ultraviolet, and the like. A value of the refractive index Np is not particularly limited; however, in terms of availability of the applied materials, the value is preferably 1.49 to 1.56. Image light transmits through the prisms 12, whereby the image light is provided to an observer.

The light-absorbing parts 13 are disposed between the prisms 12. Thus, the light-absorbing parts 13 each have a substantially triangular shape whose base is located at the upper base side of the prism 12, and apex facing the base is located at the lower base side of the prism 12. The light-absorbing parts 13 include: a binder 14 filled with a material with a refractive index of Nb; and light absorbing particles 15 mixed in the binder 14. External light enters or is absorbed by the light-absorbing parts 13, whereby the contrast of an image can be improved.

A binder material filled in the binder 14 is formed of a material with a refractive index Nb of not more than the refractive index Np of the prisms 12. The value of the refractive index Nb is not particularly limited; however, in view of availability of the applied materials, the value is preferably 1.49 to 1.56. Although the difference between the refractive indexes Np and Nb is not specifically limited, the difference is preferably 0 to 0.06. Although a material used as the binder material is not particularly limited, for example, urethane acrylate characterized by being cured by ionizing radiation, ultraviolet, and the like may be used.

According to the relation between the refractive index difference and the incident angle of image light, a part of the image light can be reflected on the interface without entering into light-absorbing parts 13. Since the reflected light is provided to an observer, a bright image can be provided.

In view of availability and handling, the average diameter of the light absorbing particles 15 is preferably 1 μm or more. The light absorbing particles 15 are colored to a predetermined density by a pigment such as carbon or a dye in red, blue, or yellow. The light absorbing particles 15 may be colored by commercially available colored resin fine particles. The refractive index Nr of the light absorbing particles 15 is not specifically limited.

Although the light absorption performance of the light-absorbing parts 13 can be suitably adjusted according to the purposes, the light-absorbing part is preferably configured to show a light absorption performance having a transmittance of 40-70% when measuring the transmittance of a 6 μm thick sheet made only of the material for constituting the light-absorbing parts 13. Means for attaining the transmittance of 40 to 70% is not limited; it includes a process for adjusting the content of light absorbing particles and the light absorption performance.

An angle θ of the oblique sides (two sides extending in the sheet thickness direction) of the light-absorbing parts 13 with respect to the normal line of the sheet surface is not particularly limited. However, in terms of suitable reflection/absorption of external light and image light, in many cases, the angle is preferably more than 0° and 10° or less, and particularly more than 0° and 6° or less.

The size of each portion of the optical sheet 10 shown by P, Q, and R in FIG. 1 can be suitably changed according to purposes and is not specifically limited; however, in many cases, the pitch P is preferably within a range of 50 to 150 μm. The opening ratio defined by (Q/P)×100% is preferably within a range of 50 to 90%, and the depth R of the light-absorbing parts 13 of FIG. 1 is preferably within a range of 50 to 150 μm.

Figure 3:
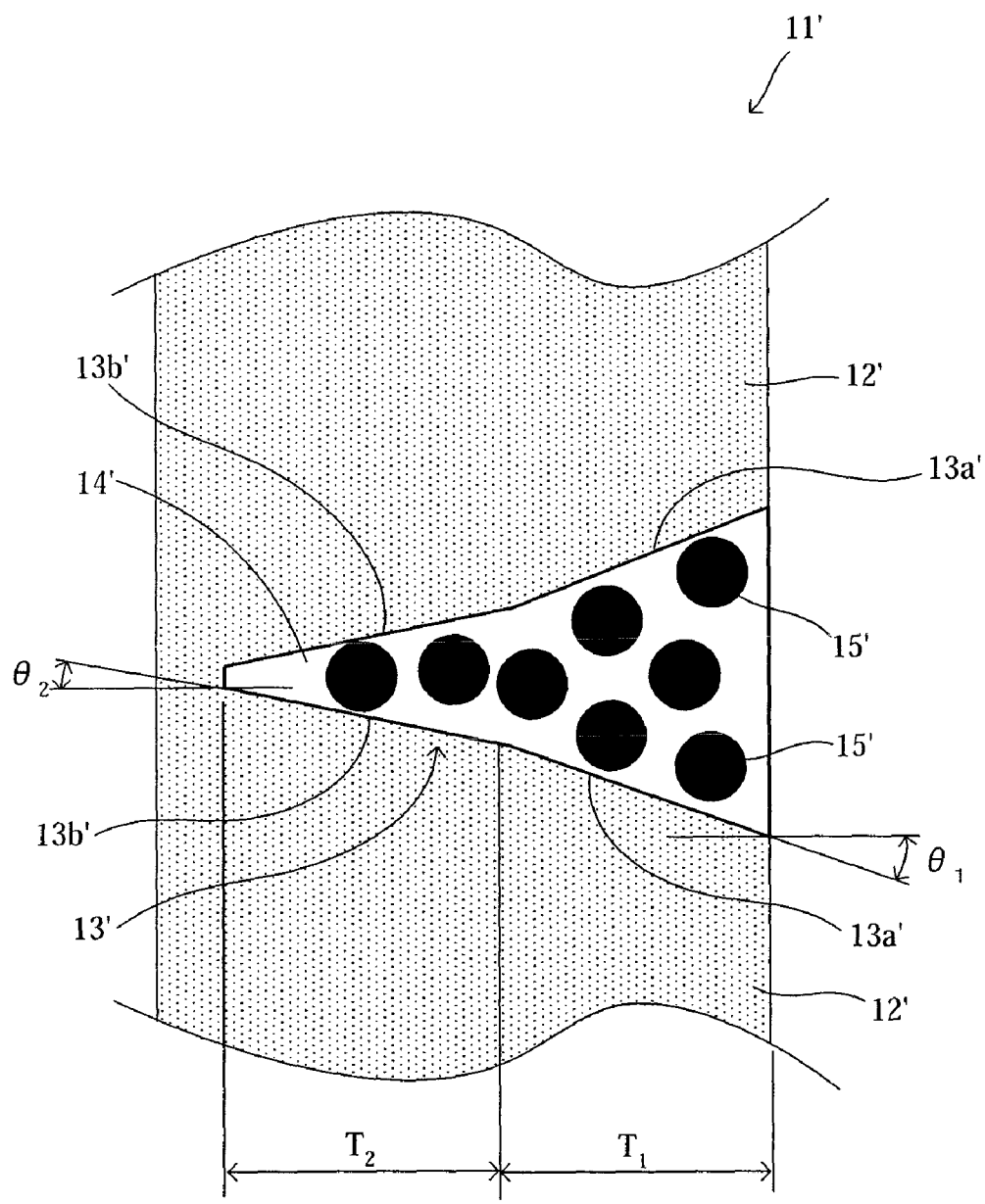
FIG. 3 is a partially enlarged view of a modification of an optical sheet.

With respect to the shape of the optical functional sheet layer 11, as shown in FIGS. 1 and 2, the prisms 12 each have a substantially trapezoidal cross section, and the light-absorbing parts 13 held between the prisms 12 each have a triangular cross section. However, if light can be suitably controlled, those shapes are not particularly limited, and other appropriate shapes are suitably used. FIG. 3 shows a modification. FIG. 3 corresponds to FIG. 2 and is a view focusing on a light-absorbing part 13' and prisms 12' provided on the both sides of the light-absorbing part 13'. As seen in FIG. 3, the oblique lines in the cross section of the light-absorbing part 13' (the oblique lines of the prisms 12') include not one oblique line but two oblique lines 13a' and 13b'. Namely, the light-absorbing part 13' has polygonal lines in the cross section. Specifically, with regard to the oblique lines 13a' provided on the upper base side of the prism 12' (the shorter base side) (the right side of FIG. 3), the oblique line 13a' has an angle $\theta_1$ with respect to the normal line of the sheet surface of the optical sheet. Meanwhile, with regard to the oblique lines 13b' provided on the lower base side of the prism 12' (the longer base side) (the left side of FIG. 3), the oblique line 13b' has an angle $\theta_2$ with respect to the normal line of the sheet surface of the optical sheet.

The angles $\theta_1$ and $\theta_2$ have a relation of $\theta_1 > \theta_2$, and they preferably fall within a range of more than 0° and 10° or less, and particularly more than 0° and 6° or less. The two oblique lines 13a' and 13b' intersect with each other at a position dividing the thickness of the optical functional sheet layer 11 into $T_1$ and $T_2$ (the left and right directions of FIG. 3). $T_1$ and $T_2$ are preferably the same thickness.

In this modification, the light-absorbing part 13' has two oblique lines. However, the light-absorbing part 13' may have three or more oblique lines to thereby have polygonal lines in cross section or may have curved oblique lines.

Figure 4:
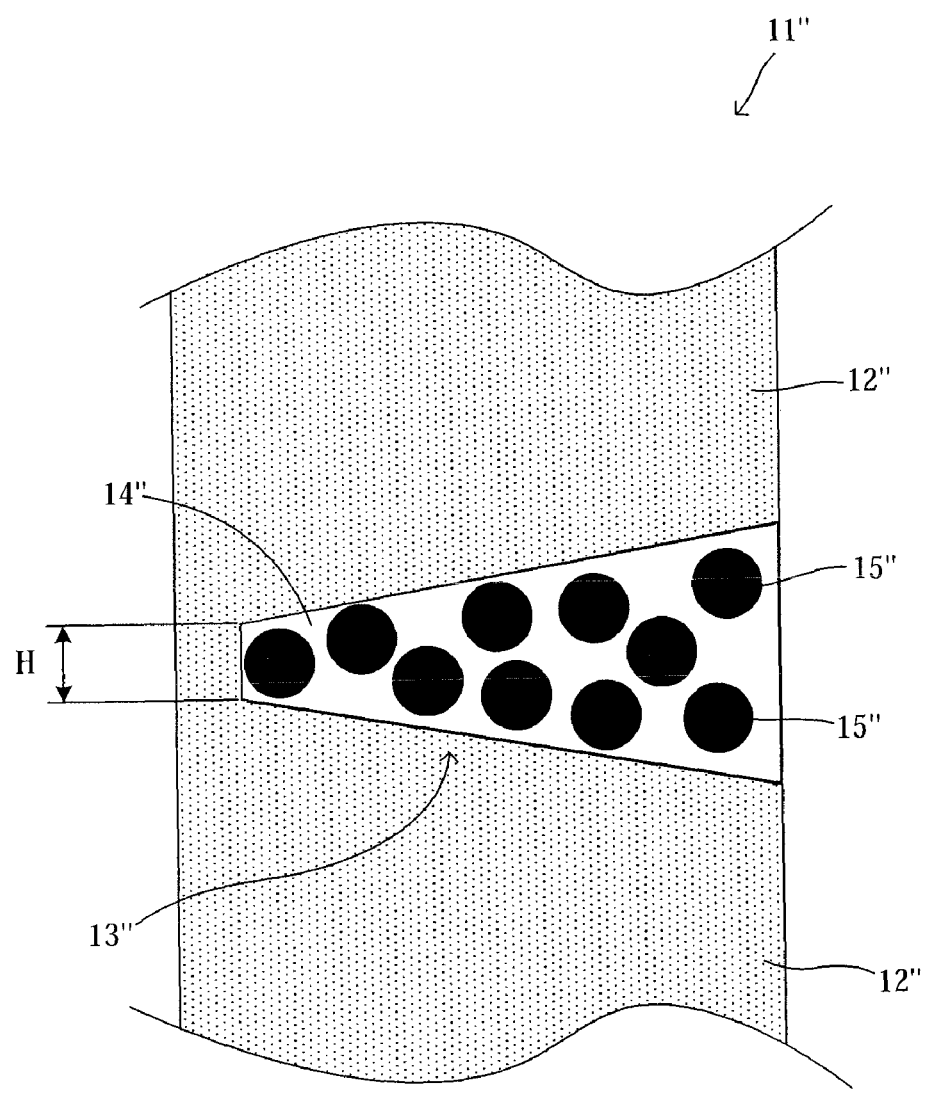
FIG. 4 is a partially enlarged view of the optical sheet when a light-absorbing part has a trapezoidal shape.

In the present embodiment, the light-absorbing parts each have a triangular shape; however, the shape is not limited thereto but may have a trapezoidal shape. FIG. 4 shows a trapezoidal light-absorbing part 13" of an optical functional sheet layer 11" of the optical sheet 10" and prisms 12" adjacent thereto. In this example, the light-absorbing part 13" has a trapezoidal shape shown in FIG. 4. In that case, the longer base (the lower base) of the trapezoid may be provided on the side remote from a PET film layer (not shown) (the right side of FIG. 4), and the shorter base may be provided on the PET film layer side (the left side of FIG. 4). The length "H" of the upper base of FIG. 4 preferably falls in a range of 2 to 25 μm.

Returning to FIG. 1, other constitution of the optical sheet 10 will be described. The PET film layer 16 is a film layer as a base for forming the optical functional sheet layer 11 on the PET film layer 16 and is composed mainly of PET. As long as the PET film layer 16 is composed mainly of PET, it may contain other resins. The main component of the PET film layer 16 is a component contained in an amount of 50 wt % or more based on the weight of the entire PET film layer 16. The PET film layer 16 may further contain a suitable amount of various additives. General additives include an antioxidant of phenol type or the like and a stabilizer of lactone type or the like.

The adhesive layer 17 is a layer disposed with an adhesive for bonding the optical sheet 10 to the image output side of PDP of a plasma television, for example, directly or through other layers. An adhesive used in the adhesive layer 17 transmits light therethrough; as long as the adhesive may suitably bond the optical sheet 10 to other components, the material is not particularly limited. For example, acrylic-type copolymer can be used, and the viscosity is, for example, approximately several N/25 mm to 20 N/25 mm.

In addition to the above characteristics of each layer, the optical sheet 10 has the following characteristics in the layer structure. As it were, in the optical sheet 10, the adhesive layer 17 is disposed on one side of the PET film layer 16, and the optical functional sheet layer 11 is disposed on the other side. In that case, the wide lower base of each of the prisms 12 of the optical functional sheet layer 11 is provided on the PET film layer 16 side, and the narrow upper base is provided on the side of the optical functional sheet layer 11 remote from the PET film layer 16. Accompanying this, each base of the light-absorbing parts 13 is provided on the side of the optical functional sheet layer 11 remote from the PET film layer 16 (the upper base side of the prisms 12).

Figure 5:
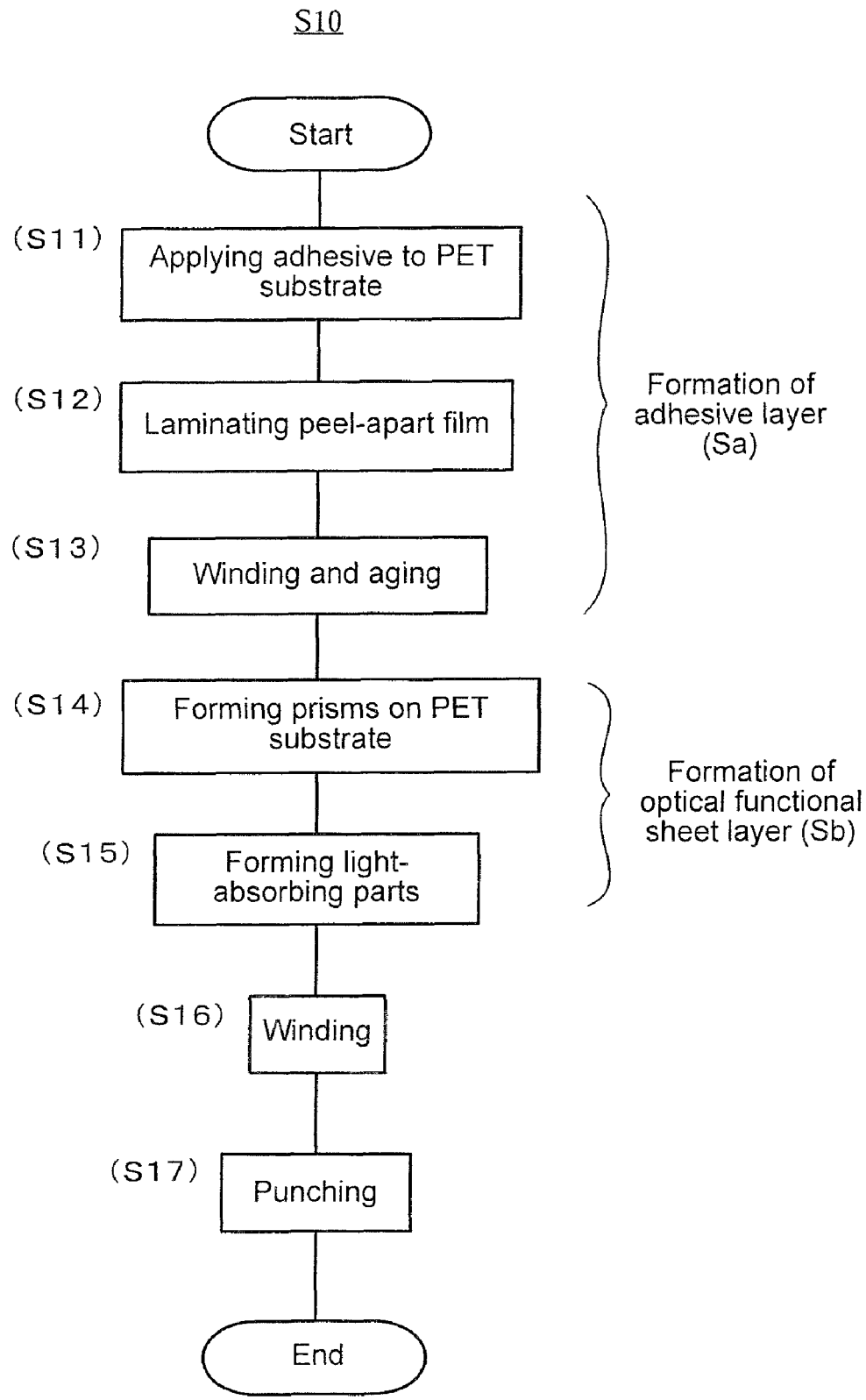
FIG. 5 is a flowchart of a method for producing an optical sheet.

According to the above constitution, the optical sheet 10 can be produced more efficiently than ever before. Hereinafter, a method for producing the optical sheet 10 will be described. FIG. 5 is a flow chart showing an example of a production process of the optical sheet 10 (production process S10). FIGS. 6A, 6B and 7A, 7B are views for explaining a part of the production process S10. The production process S10 will be described with reference to FIGS. 5 to 7B. The production process S10, as shown in FIG. 5, includes: step S11 for applying an adhesive to a PET substrate which will be the PET film layer 16; step S12 for laminating a peel-apart film; step S13 for winding and aging; step S14 for forming prisms on the PET substrate, step S15 for forming light-absorbing parts, winding step S16; and punching step S17. Hereinafter, those steps will be described. For ease of explanation, the above steps are sometimes referred to merely as, such as, "the process S11".

In steps S11 to S17, the adhesive layer is formed in steps S11 to S13, and an optical functional sheet layer is formed in steps S14 and S15. In the production process S10 of the optical sheet, the adhesive layer 17 and the optical functional sheet layer 11 may be formed in one continuous process, and more specifically as follows.

Figure 6A:
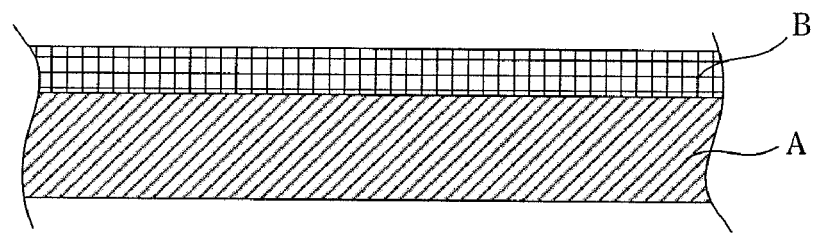
FIGS. 6A and 6B are views for explaining the method for producing an optical sheet.

Step S11 is a step of applying an adhesive B onto one side of a PET substrate A, as shown in FIG. 6A. Although a method for applying the adhesive is not particularly limited, the adhesive B may be applied, for example, by spraying onto the surface of the PET substrate A through a slit-type nozzle such that the thickness of the adhesive B is uniformed.

Figure 6B:
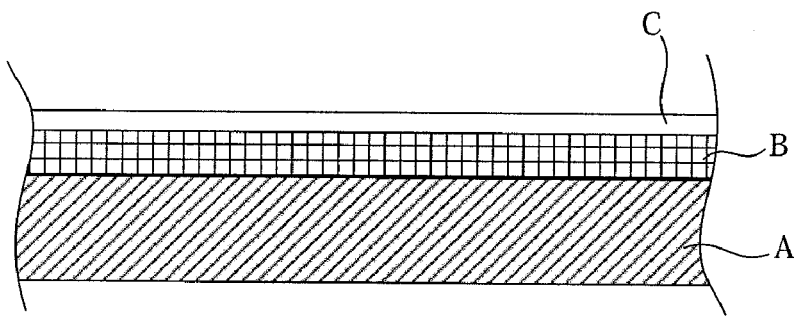

Step S12 is a step of stacking a peel-apart film C on the side of the adhesive B opposite to the PET substrate A, as shown in FIG. 6B. The peel-apart film C serves to protect the adhesive layer 17 from contamination and the like until the optical sheet 10 is attached to the PDP 2. Thus, when the optical sheet 10 is attached to the PDP 2, the peel-apart film C is peeled.

The sheet stacked with the PET substrate A, the adhesive B, and the peel-apart film C is wound and aged in step S13, whereby the adhesive layer 17 is formed.

Figure 7A:
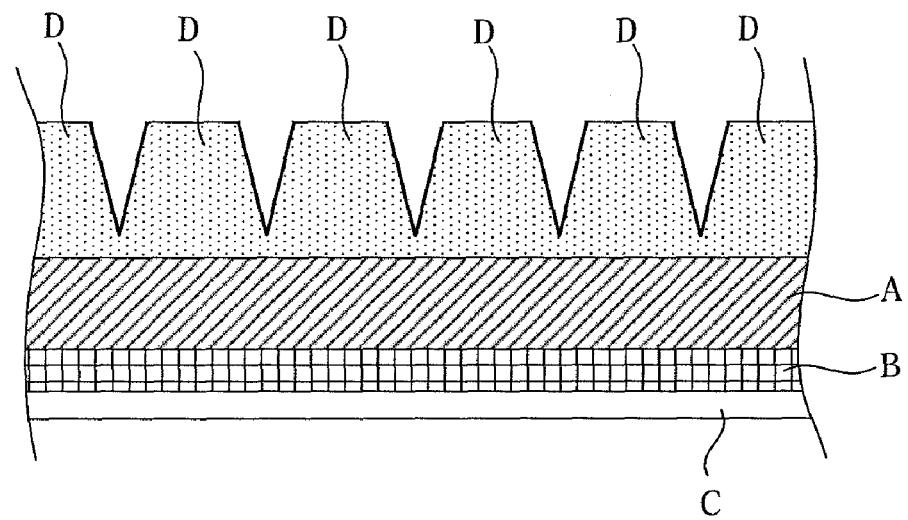
FIGS. 7A and 7B are other views for explaining the method for producing an optical sheet.

Step S14 is a step of forming prisms D on one side of the PET substrate A remote from the adhesive B, as shown in FIG. 7A. Specifically, a liquid body which is a material of the prisms D is applied to the one side of the PET substrate A. Then, while the material of the prisms is held between a roll mold for forming the shape of the prism and a PET substrate sheet, ultraviolet is irradiated to cure the material, thus, to form the prisms D. The prisms D are the prisms 12.

Figure 7B:
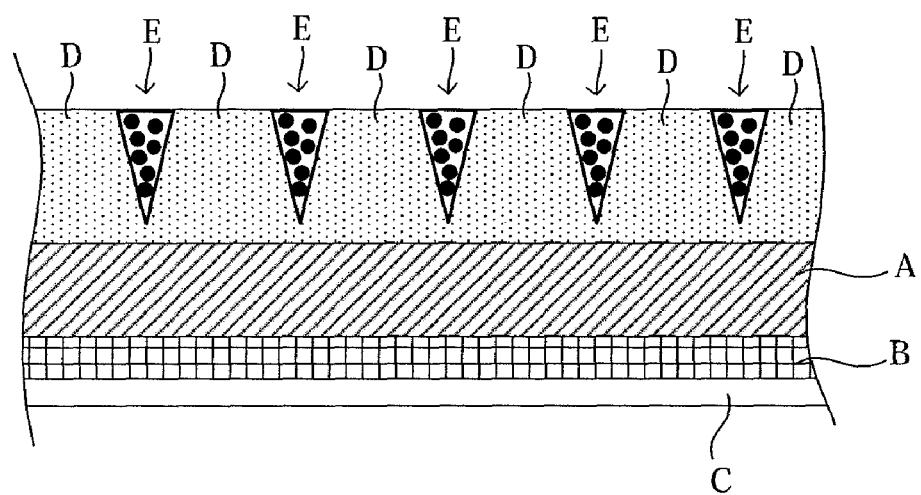

Step S15 is a step of forming parts E of FIG. 7B to be the light-absorbing parts 13. Specifically, a liquid body is filled in between the prisms D, the liquid body being a material of a binder and including a transparent resin containing black light absorbing particles. Ultraviolet is then irradiated to cure the liquid body, thus, to form the parts E.

Thereafter, winding is performed in step S16, and the optical sheet 10 with a predetermined size is formed in step S17.

According to the production process S10 of the optical sheet 10, as described above, the formation of the adhesive layer (Sa) and the formation of the optical functional sheet layer (Sb) can be performed in one continuous process, whereby the production efficiency can be improved. In the production process S10, only one peel-apart film is used, unlike the conventional production process requiring two peel-apart films; therefore, the number of materials used in the production can be reduced.

Although the production process S10 has been described as an example, the formation of the adhesive layer (Sa) and the formation of the optical functional sheet layer (Sb) may be changed in that order; alternatively, the optical functional sheet layer may be formed before the formation of the adhesive layer in order of Sb to Sa. In that case, the prisms and the light-absorbing parts are formed on the PET substrate, and thereafter, the adhesive layer is formed on the opposite side of the PET substrate layer. In this example, in view of more accurate and efficient production, the production process 10 has been mainly described as a preferred production method.

Figure 8:
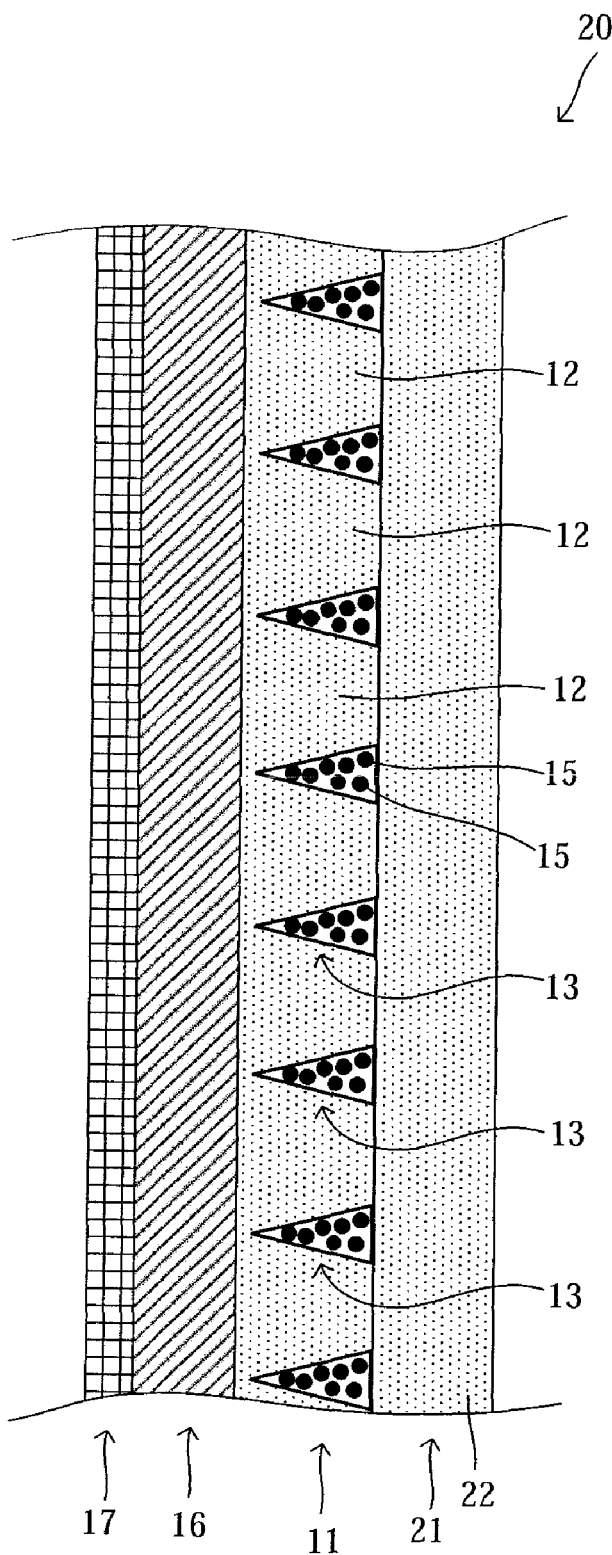
FIG. 8 is a cross-sectional view of an optical sheet according to the second embodiment of the present invention and shows a schematic layer structure of the optical sheet.

FIG. 8 is a cross-sectional view of an optical sheet 20 according to a second embodiment and shows a schematic layer structure of the optical sheet 20. The optical sheet 20 includes an optical functional sheet layer 21 in addition to the optical functional sheet layer 11 of the optical sheet 10 of the first embodiment. The optical functional sheet layer 21 is disposed on the surface of the optical functional sheet layer 11 opposite to the PET film layer 16. In that case, a prism 22 and a light-absorbing part (not shown) are disposed perpendicular to the prisms 12 and the light-absorbing parts 13 of the optical functional sheet layer 11. Thus, the prism 22 and the light-absorbing part of the optical functional sheet layer 21 are alternately arranged in parallel on the far/near side of FIG. 8.

In the light-absorbing parts of the optical sheets 10 and 20, the binder contains the light-absorbing particles, whereby the light-absorbing parts can absorb light. However, the light-absorbing part does not necessarily have the above constitution as long as it can absorb light. For example, a black or other colored light curing resin may be filled in the entire light-absorbing part. This constitution can also provide the optical sheet of the present invention. In that case, after the formation of the prism in the above manner, the relevant resin is filled in a part which will be the light-absorbing part and ultraviolet or the like is irradiated; whereby the light-absorbing part can be formed.

The base material layer is not necessarily formed of PET, "a polyester-based resin" such as polybutylene terephthalate resin (PBT) and polytrimethylene terephthalate resin (PTT) may be used. In the present embodiments, in view of performance, mass productivity, price, availability, and the like, a resin composed mainly of polyethylene terephthalate (PET) is preferably used as the material of the base material layer.

The optical sheet of the present invention may further include functional film layers such as: a film layer blocking electromagnetic waves; a film layer correcting a color tone; a film layer cutting a neon line; a film layer cutting infrared rays; a film layer preventing reflection; a film layer preventing static charge; and a film layer for anti glare.

Figure 9:
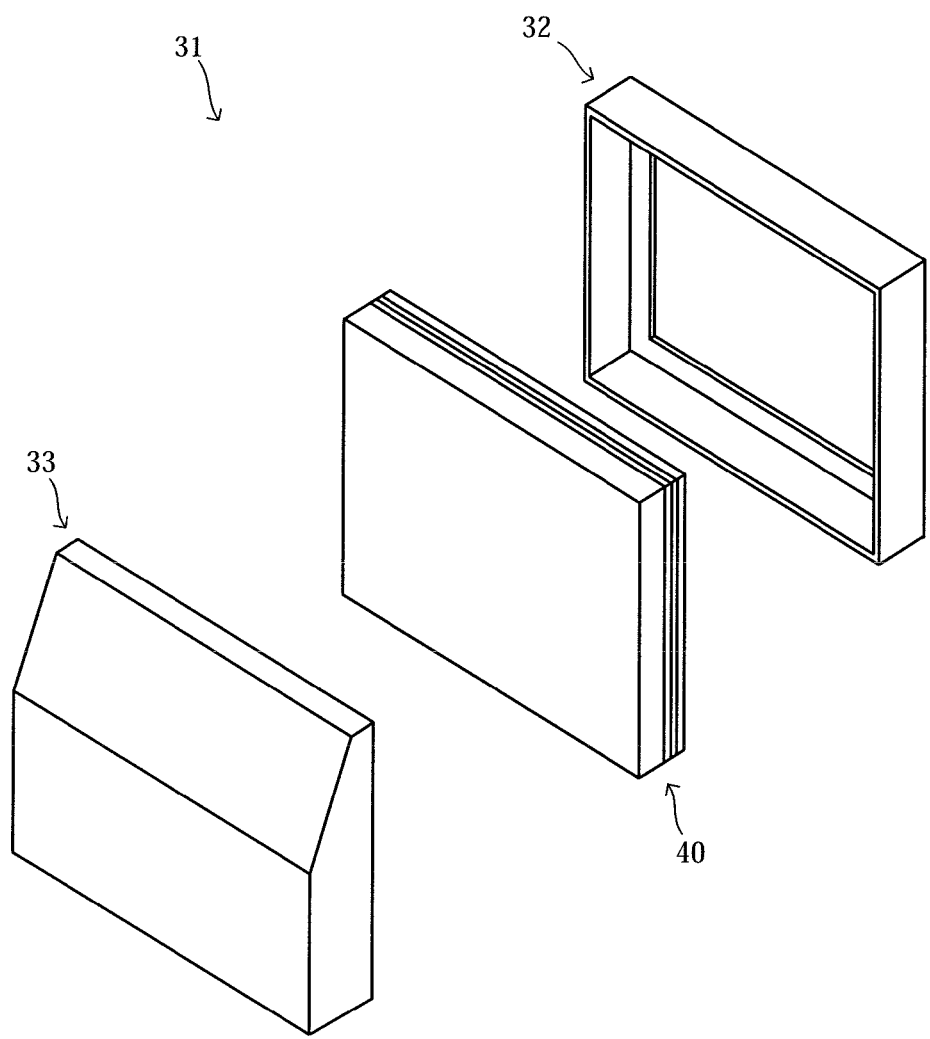
FIG. 9 is a schematic exploded perspective view of a display device according to the third embodiment.

FIG. 9 is a schematic exploded perspective view of a plasma television 31 which is a display device according to a third embodiment. In FIG. 9, the upper right side is the observer side, and the lower left side is the rear side of the plasma television 31. As seen in FIG. 9, the plasma television 31 includes a PDP unit 40 as an image source unit which is disposed in a housing formed by a front housing 32 and a rear housing 33.

In addition to the PDP unit 40, the plasma television 31 further includes in its housing, other devices usually provided in a plasma television. Those devices include various electrical circuits and cooling means.

Figure 10:
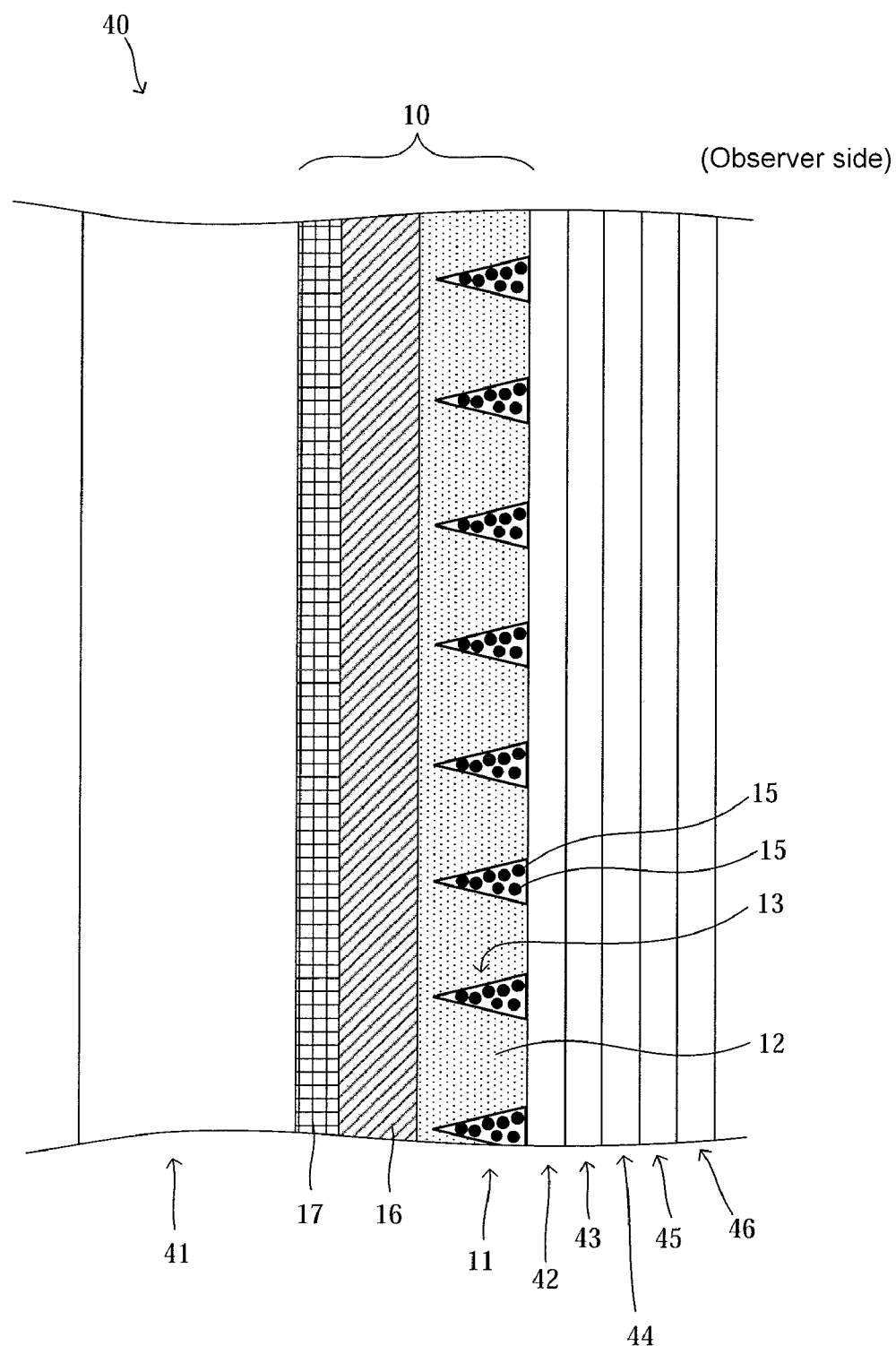
FIG. 10 is a view showing a layer structure of a PDP unit of the display device of FIG. 9.

FIG. 10 is a cross-sectional view of the PDP unit 40 and shows a schematic layer structure of the PDP unit 40. In FIG. 10, for ease of viewability, the repeated reference numerals are partially not described (the same holds for the following drawings). In FIG. 10, the left side is the rear side of the display device 31, and the right side is the observer side. The PDP unit 40 includes, from the rear side of the display device 31 toward the observer side: a PDP 41; the optical sheet 10; an electromagnetic wave shielding film 42; a toning film 43; an antistatic film (AS: antistatic) 44; an antireflection film (AR: antireflection) 45; and an anti-glare film (AG: anti-glare) 46.

The PDP 41 is a plasma display panel which is a plate-shaped image source, and a PDP used for a usual plasma television may be used as it is as the PDP 41. Thus, same as in a usual PDP, the PDP 41 includes: pixels, each of which has phosphors of three primary colors as one unit, vertically and horizontally arranged in parallel; and electrodes for generating ultraviolet rays by gas discharge.

In the above example, the PDP is used as the image source; however, the image source is not limited thereto. An image source with a high flatness, such as a well-known electroluminescence display panel (FED), surface-conduction electron-emitter display (SED), and organic EL, may be used.

The optical sheet 10 is the above-described one and is adhered to the PDP 41 by the adhesive layer 17 of the optical sheet 10.

In addition to the characteristics of each of the above-described layers, the PDP unit 40 of the plasma television 31 has the following characteristics of the layer structure. Namely, in the optical sheet 10, the adhesive layer 17 is disposed on the surface of the PET film layer 16 on the PDP 41 side, and the optical functional sheet layer 11 is disposed on the surface of the PET film layer 16 on the observer side. In that case, the wide lower base of each of the prisms 12 of the optical functional sheet layer 11 is provided on the PET film layer 16 side, and the narrow upper base is provided on the observer side. Accompanying this, each base of the light-absorbing parts 13 is provided on the observer side (the upper base side of the prisms 12).

Further, other constitutions of the PDP unit 40 will be described. The electromagnetic wave shielding film 42 is a film having a translucency and serving to shield electromagnetic waves generated from the PDP 41. As long as the electromagnetic wave shielding film is a film for such purposes, the kind is not particularly limited. However, as a usually available electromagnetic wave shielding film, the film formed of a metal mesh and the film formed of a transparent electroconductive film may be used.

The toning film 43 is also called a "Tint layer" and is a film which corrects a color of the image light from the PDP 41. The toning film 43 may be configured to shield neon lines. The toning film 43 contains a dye and a pigment so as to perform desired color correction.

The antistatic film 44 is also called an antistatic (AS) film and is a film which prevents electrostatic charge, that is, prevents charging of static electricity. A usually available AS film may be used as the antistatic film 44.

The antireflection film 45 is also called an antireflection (AR) film and is a film which prevents external light or the like entering a screen from reflecting on the screen on the observer side to reduce a contrast or from reflecting in the screen. A usually available AR film can be used as the antireflection film 45.

The anti-glare film 46 is also called an anti-glare (AG) film and is a film which can prevent glare when an observer looks at a screen. A usually available AG film may be used as the anti-glare film 46.

Figure 11:
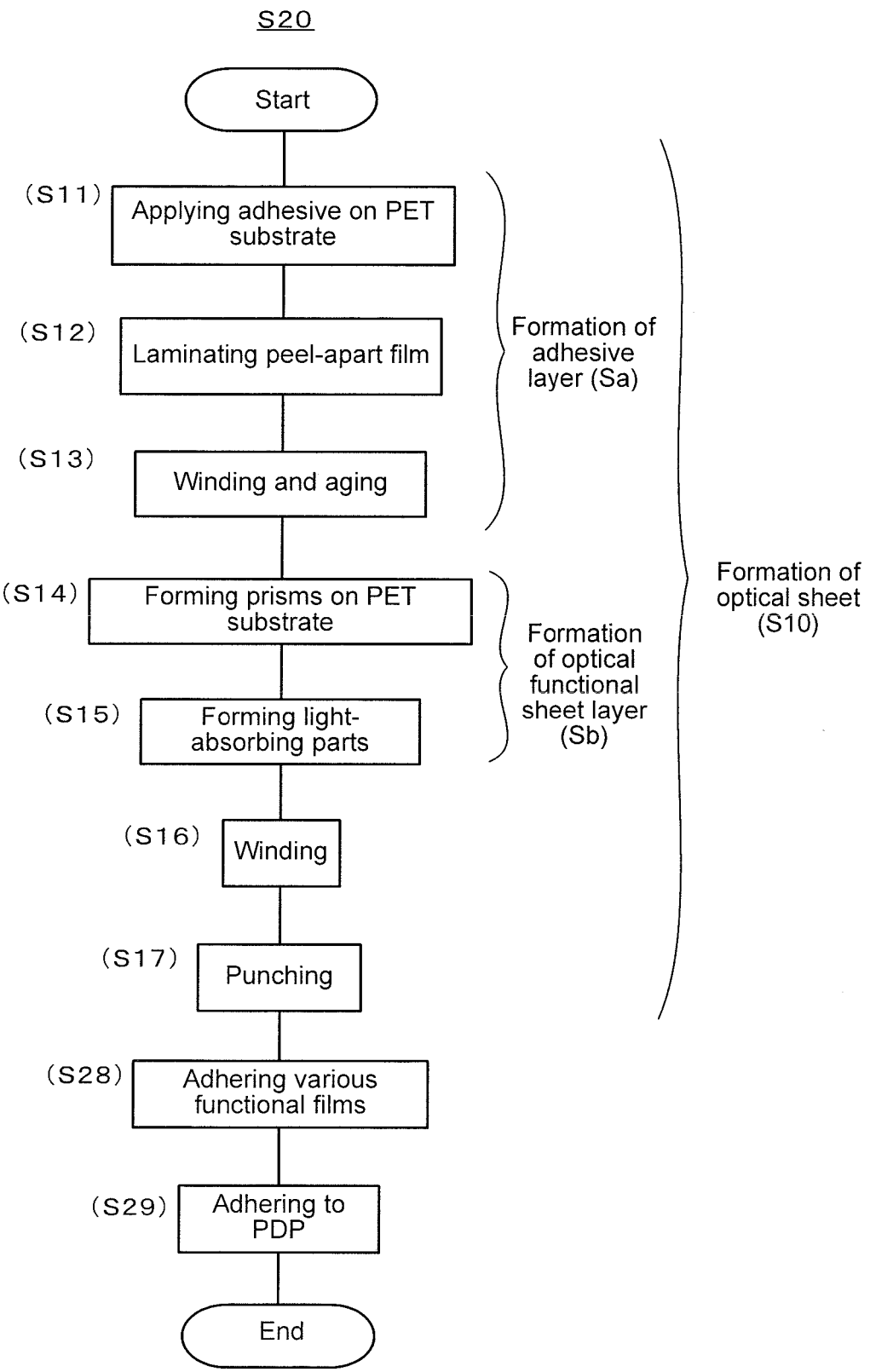
FIG. 11 is a flow chart of a method for manufacturing the PDP unit in a method for manufacturing the display device.

According to this constitution, the plasma television 31 can be manufactured more efficiently than ever before. Hereinafter, a method for manufacturing the plasma television 31 will be described. FIG. 11 is a flow chart of an example of a process for manufacturing the PDP unit 40 (manufacturing process S20) in the method for manufacturing the plasma television 31.

The manufacturing process S20, as seen in FIG. 11, includes the production process S10 and steps S28 and S29. The description of the production process S10 will not be described here. In step S28, the functional films which are the electromagnetic wave shielding film 42, the toning film 43, the antistatic film (AS: antistatic) 44, the antireflection film (AR: antireflection) 45, and the anti-glare film (AG: anti-glare) 46 are adhered onto the surface of the optical functional sheet layer 21 of the optical sheet obtained by the production process S10. At that time, various optical films are usually adhered in a cut form; these may be adhered in a roll form.

The peel-apart film on the adhesive layer 17 is peeled in step S29, and the adhesive layer 17 is then adhered to the image output side of the PDP 41; whereby the PDP unit 40 is provided.

The PDP unit 40 obtained in the above manner is combined with other members, whereby the plasma television 31 is manufactured. The process to incorporate the PDP unit 40 into the plasma television 31 may be carried out in the similar manner as the manufacturing of a usual plasma television.

According to the manufacturing process S20, as described above, the formation of the adhesive layer (Sa) and the formation of the formation of the optical functional sheet layer (Sb) may be performed in one continuous process, whereby the production efficiency can be improved. In the manufacturing process S20, only one peel-apart film is used, unlike the conventional production process requiring two peel-apart films, therefore, the number of materials used in the manufacturing can be reduced; whereby the manufacturing cost can also be reduced.

The manufacturing process S20 has been described as one example of the manufacturing process; however, the formation of the adhesive layer (Sa) and the formation of the optical functional sheet layer (Sb) may be changed in that order, and thus the optical functional sheet layer may be formed before the formation of the adhesive layer in order of Sb to Sa. In that case, the prisms and the light-absorbing parts are formed on the PET substrate, and thereafter, the adhesive layer is formed on the opposite side of the PET substrate layer. In this example, in view of more accurate and efficient manufacturing, the manufacturing process 20 has been mainly described as a preferred manufacturing process.

Figure 12:
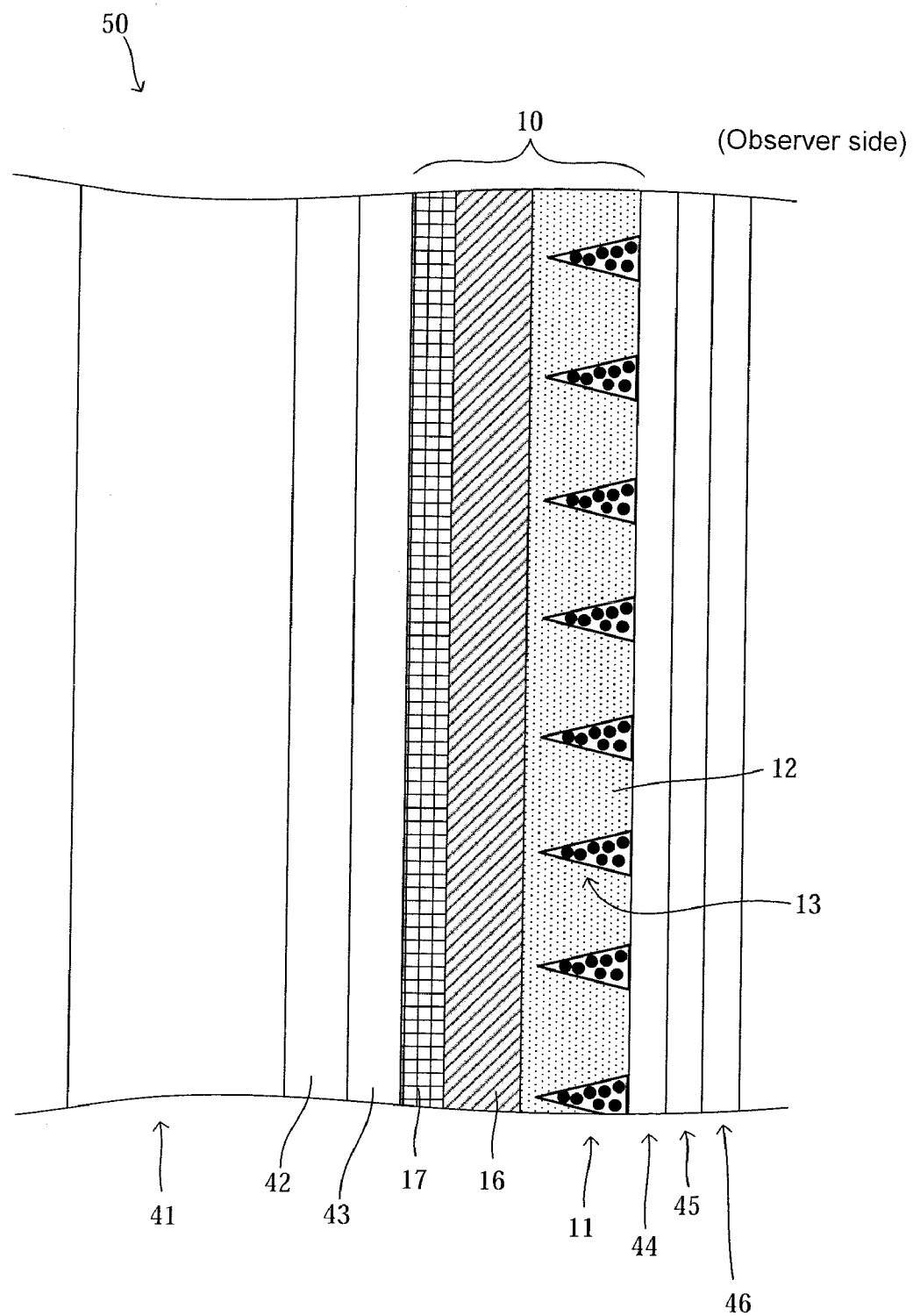
FIG. 12 is a view showing a layer structure of a PDP unit of a display device according to the fourth embodiment.

FIG. 12 is a view focusing on a PDP unit 50 of a plasma television according to a fourth embodiment and shows a schematic layer structure of the PDP unit 50. In the PDP unit 50, the common components with those in the PDP unit 40 are assigned the same reference numerals. The same holds for the following embodiments. The PDP unit 50 includes: an electromagnetic wave shielding film 42; a toning film 43; an optical sheet 10; an antistatic film (AS: antistatic) 44; an antireflection film (AR: antireflection) 45; and an anti-glare film (AG: anti-glare) 46 stacked from the PDP 41 side toward the observer side. A plasma television including the PDP unit 50 may also be applied to the display device of the present invention. According to this constitution, since the light-absorbing parts 13 are disposed closer to the observer side, external light is more easily absorbed; it becomes possible to obtain a layer structure that stresses contrast.

Figure 13:
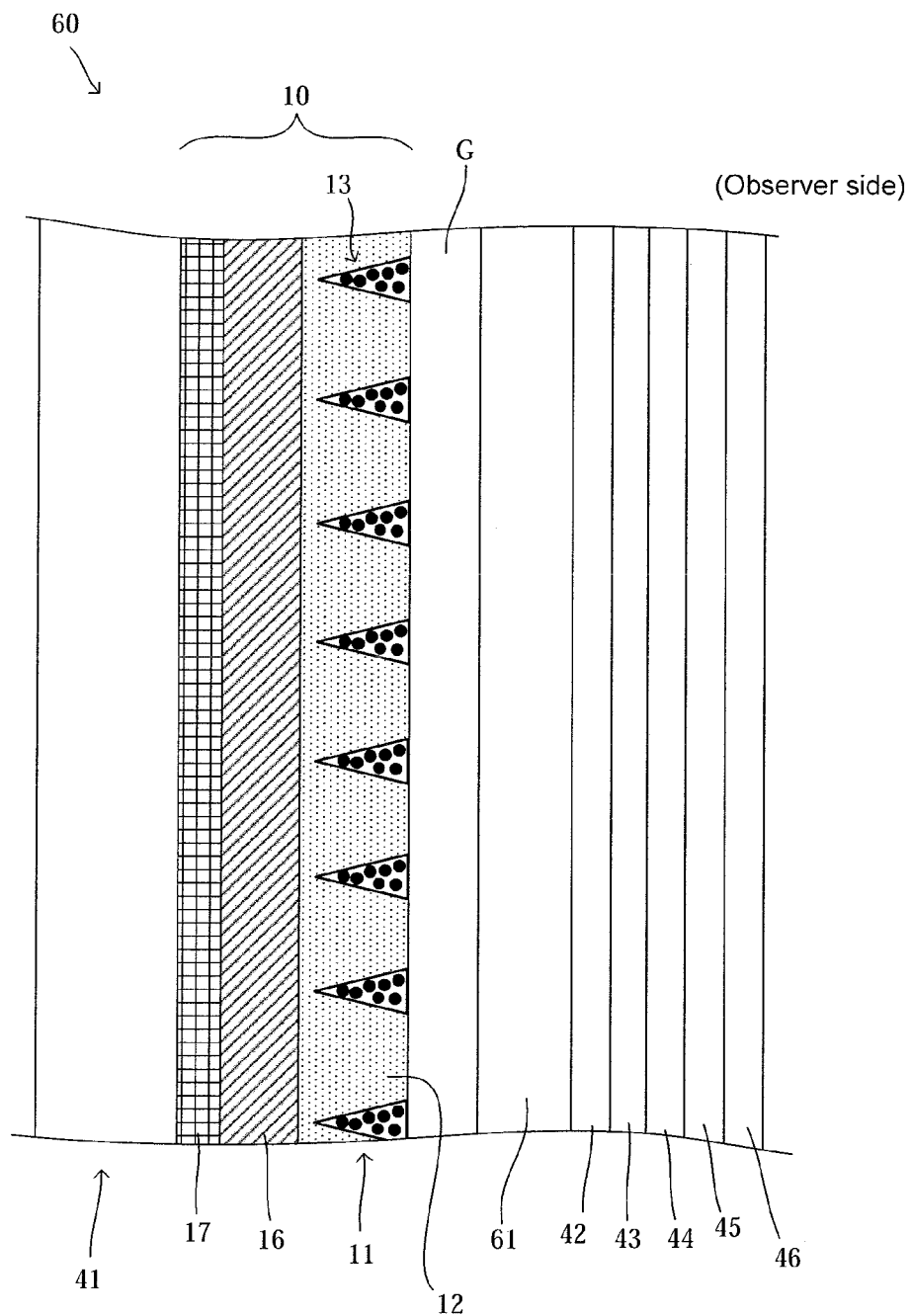
FIG. 13 is a view showing a layer structure of a PDP unit of a display device according to the fifth embodiment.

FIG. 13 is a view focusing on a PDP unit 60 of a plasma television according to a fifth embodiment and shows a schematic layer structure of the PDP unit 60. In the PDP unit 60, the optical sheet 10 is directly stacked on the image output side on the PDP 41 side, in addition to this, a glass layer 61, an electromagnetic wave shielding film 42, a toning film 43, an antistatic film (AS: antistatic) 44, an antireflection film (AR: antireflection) 45, and an anti-glare film (AG: anti-glare) 46 are stacked on the observer side with an interval G. A plasma television including the PDP unit 60 may also be applied to the display device of the present invention. According to this constitution, the optical sheet 10 having a complex structure and other layers having a relatively simple structure are separated from each other, whereby the PDP unit can be easily handled upon manufacturing. For example, when any one of the films stacked on the glass layer 61 should be applied again, the film can be applied without affecting the optical sheet 10.

Figure 14:
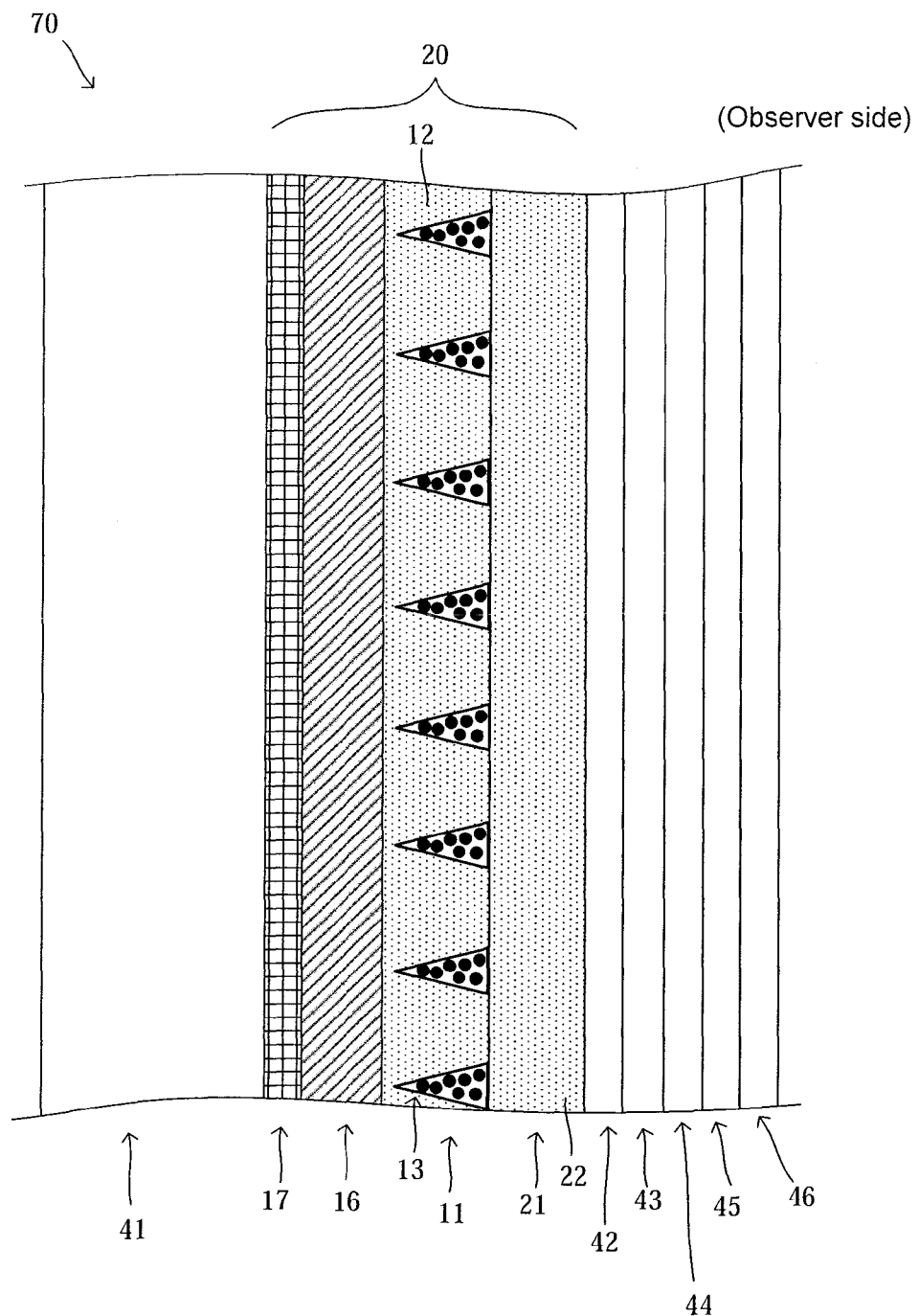
FIG. 14 is a view showing a layer structure of a PDP unit of a display device according to the sixth embodiment.

FIG. 14 is a view focusing on a PDP unit 70 of a plasma television according to a sixth embodiment and shows a schematic layer structure of the PDP unit 70. The PDP unit 70 includes an optical sheet 20 instead of the optical sheet 10 used in the PDP unit 40.

Figure 15:
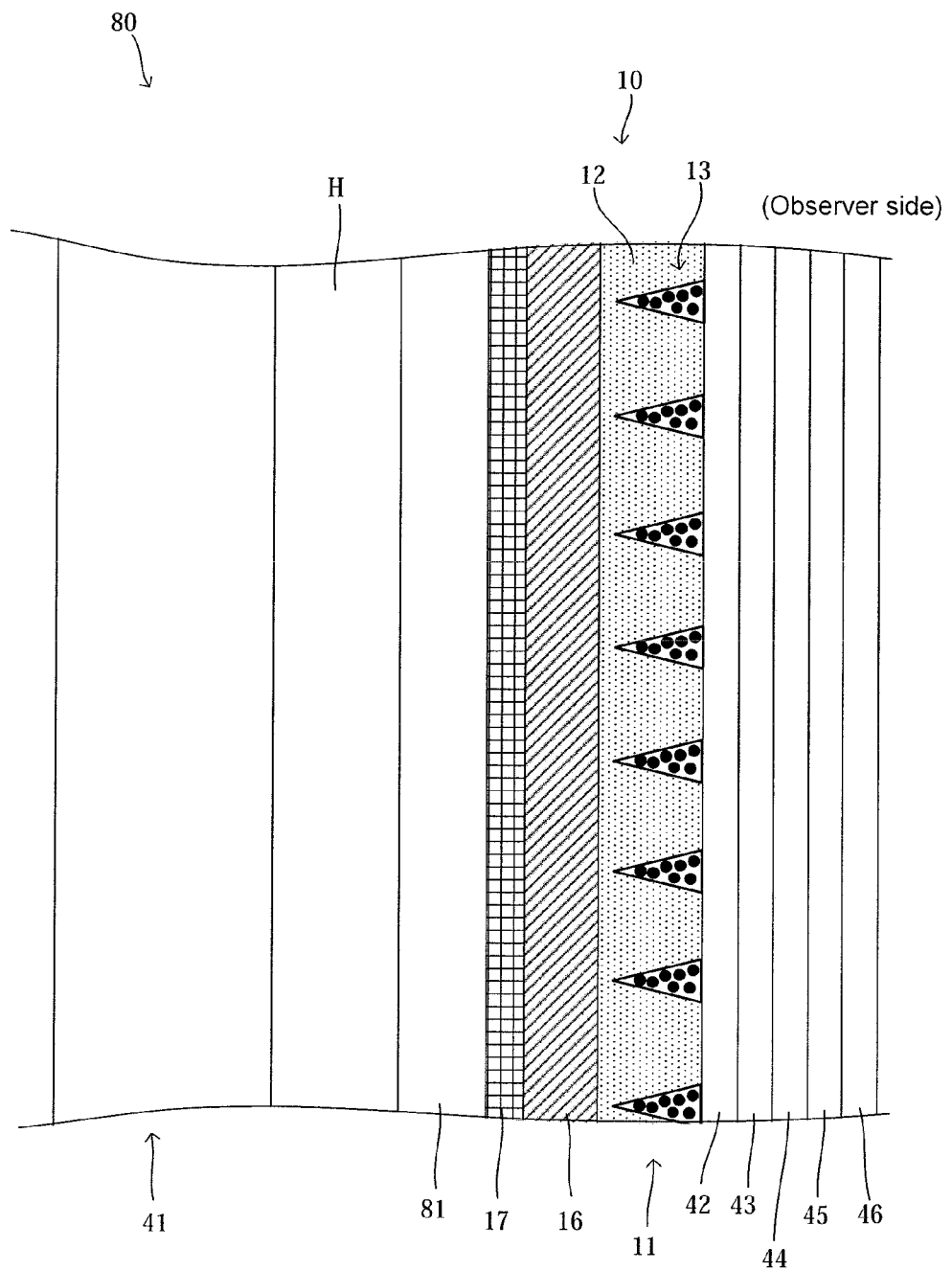
FIG. 15 is a view showing a layer structure of a PDP unit of a display device according to the seventh embodiment.

FIG. 15 is a view focusing on a PDP unit 80 of a plasma television according to a seventh embodiment and shows a schematic layer structure of the PDP unit 80. The PDP unit 80 is of the so-called "glass filter type". The PDP unit 80 includes the optical sheet 10 and other layers stacked on the observer side of a glass layer 81 disposed with an interval H from the PDP 41.

The order in which the electromagnetic wave shielding film 42, the toning film 43, the antistatic film (AS: antistatic) 44, the antireflection film (AR: antireflection) 45, and the anti-glare film (AG: anti-glare) 46 are stacked and the stacked layers are not limited thereto, and they may be suitably changed according to purposes. However, it is preferable that the AG layer, by its nature, is disposed closest to the observer side. The AR film and the AG film may be constituted of one film having the both characteristics. In addition to the above layers, other layers may be further stacked, and, for example, a layer that blocks neon lines and a layer that blocks infrared rays may be stacked.

The optical sheet having the above constitution will be described in more detail in the following example. However, the present invention is not limited to the scope of the example.

EXAMPLE

Figure 18:
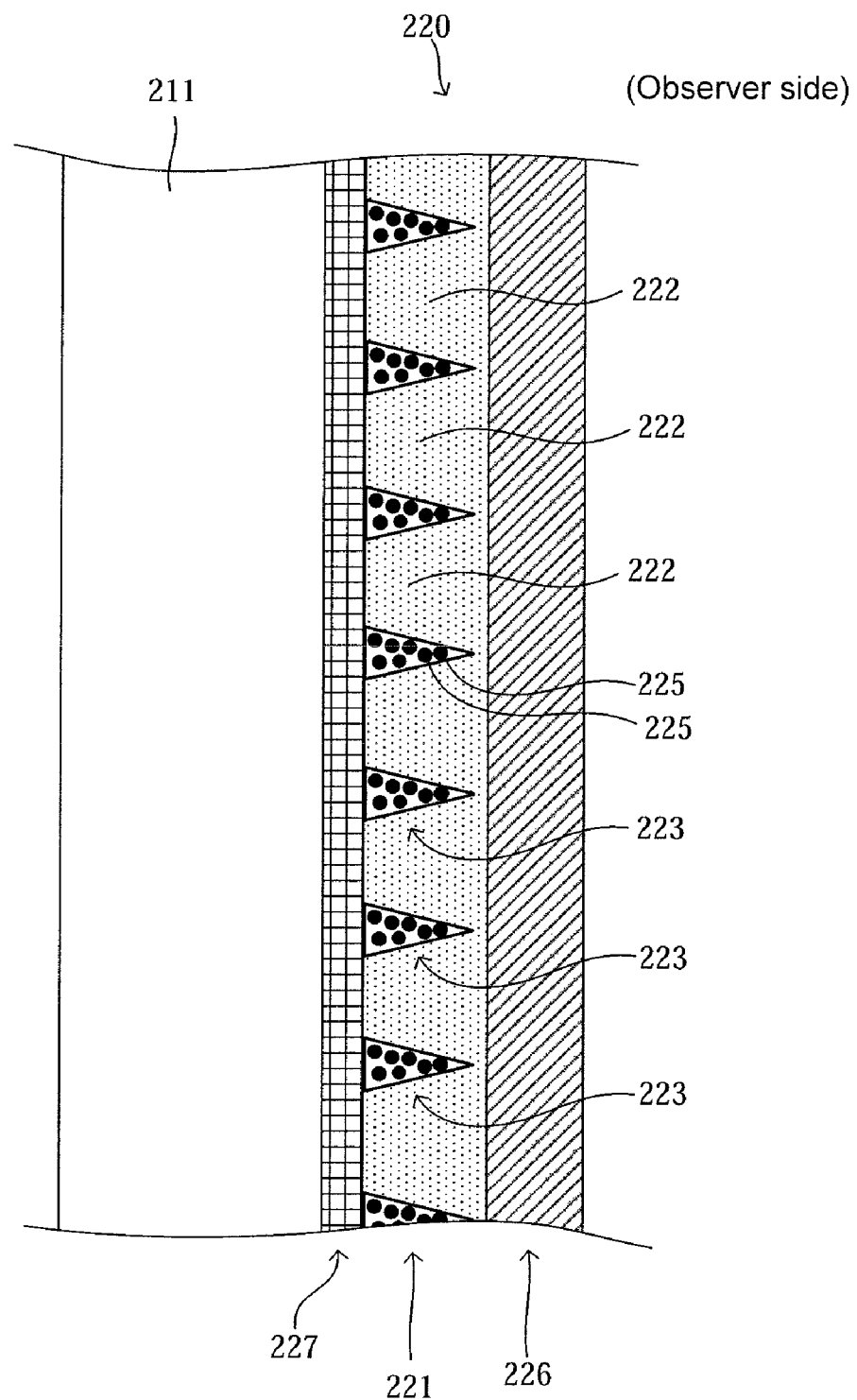
FIG. 18 is a cross-sectional view of the conventional optical sheet and shows a schematic layer structure of the optical sheet.

In the optical sheet and the display device of the present invention, the direction of the optical functional sheet layer is reversed relative to the conventional optical sheet and display device (for example, comparison with FIGS. 1 and 18). The optical sheet and the display device of the invention can improve the productivity as described above; the present example will describe that compared to the conventional, the optical sheet and the display device of the present invention can maintain the performance. This will be hereinafter specifically described.

<Test Samples>

As test samples, two optical sheets which are different in the stacked position and the direction of the optical functional sheet layer are produced. One of the optical sheets is the optical sheet of the present invention, and the other one is the conventional optical sheet. The specifics are shown in Table 1.

TABLE 1

| No. | Pitch of light-absorbing parts (μm) | Aperture ratio (%) | Slope angle of light-absorbing part (degree) | Thickness of optical functional sheet layer (μm) | Position of optical functional sheet layer | Direction of wide base of light-absorbing part |
|---|---|---|---|---|---|---|
| Present example | 70 | 70 | 4.5 | 100 | Observer side surface of PET film layer | Observer side |
| Coventional example | 70 | 70 | 4.5 | 100 | Between adhesive layer and PET film layer | Image source side |

Based on the optical sheet shown in table 1, the performance test of view angle properties and a contrast was carried out.

<View Angle Measurement>

The view angle properties were obtained by measuring a relative luminance at each view angle. The view angle means an angle formed by the normal line of a screen from the center of the screen and a line of sight toward the center of the screen. With regard to the view angle, the upper side of FIG. 12 is positive, and the lower side of FIG. 12 is negative. The relative luminance means the ratio (percentage) of the luminance in the case where the optical sheet is disposed to the luminance of 100% in the case where the optical sheet is not disposed. The measurement is performed for each angle by using an automatic goniophotometer (GP-500, manufactured by Murakami Color Research Laboratory Co., Ltd.).

<Contrast>

Figure 16A:
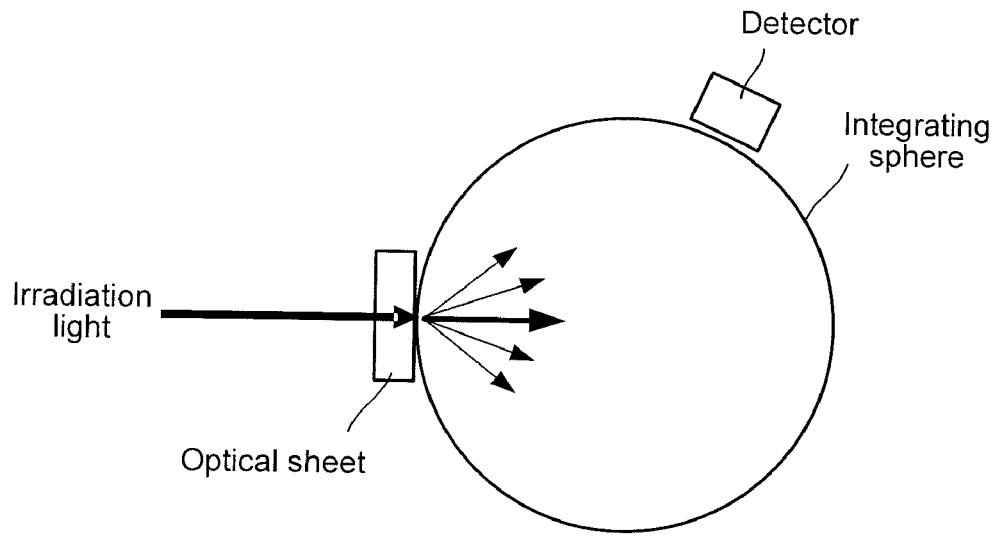
FIGS. 16A and 16B are views for explaining a method for measuring a total light transmittance and a diffuse reflectance.
Figure 16B:
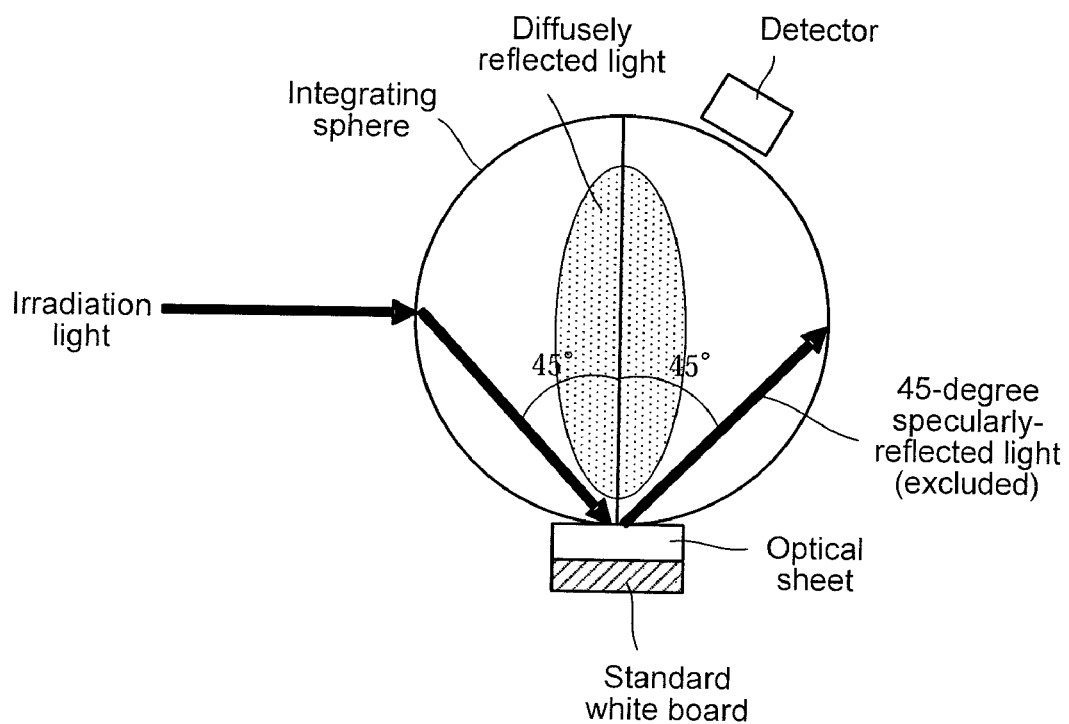

The contrast is a value obtained by dividing a total light transmittance by a diffuse reflectance. FIGS. 16A and 16B are views for explaining a method for measuring the total light transmittance and the diffuse reflectance. The total light transmittance covers all light having transmitted through an optical sheet, as shown in FIG. 16A, and is the ratio between omnidirectional light in an integrating sphere and irradiation light. Meanwhile, the diffuse reflectance is defined by an omnidirectional diffuse reflectance obtained by excluding a 45-degree specularly-reflected light from the total diffuse reflectance. In the measurement, as shown in FIG. 16B, a standard white board is disposed on the rear side of the optical sheet, the 45-degree specularly-reflected light is excluded, and the omnidirectional light in the integrating sphere at that time is obtained by a detector.

Figure 17:
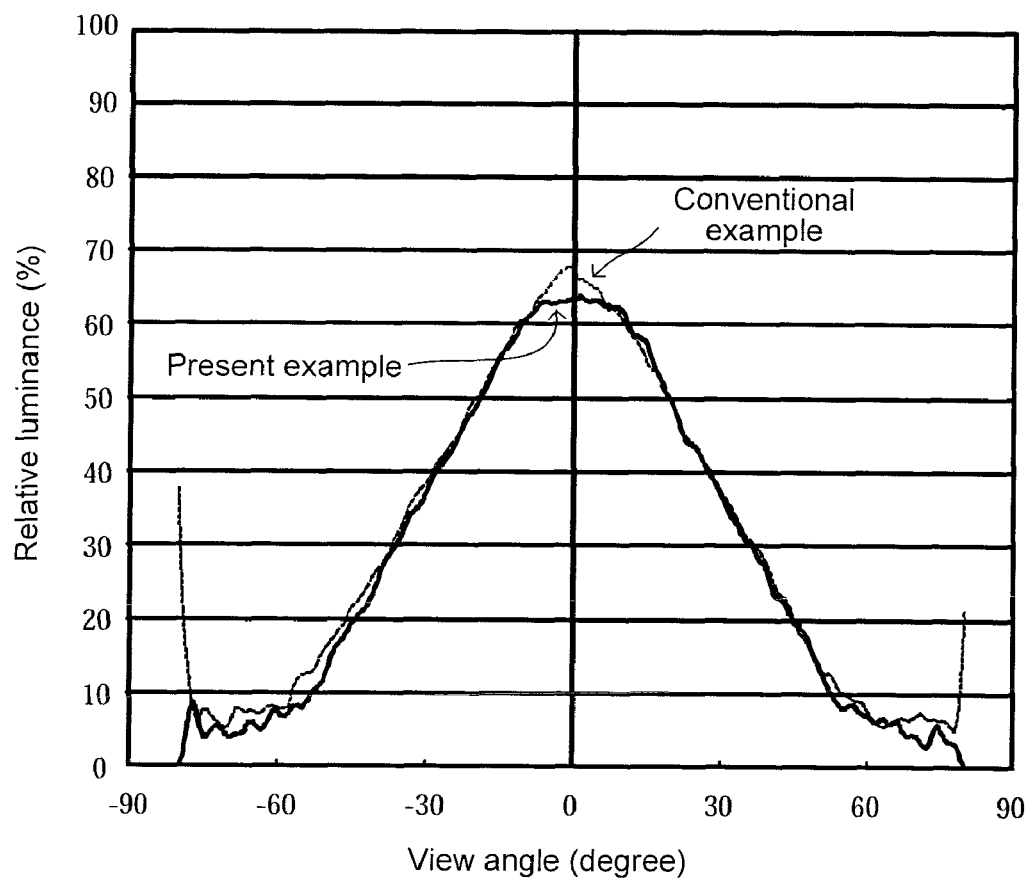
FIG. 17 is a graph showing a relation between a view angle and a relative luminance, as one of the results of the present example.

Hereinafter, the results will be described. FIG. 17 is a graph in which the horizontal axis represents the view angle, and the vertical axis represents the relative luminance at each view angle. The thick solid line shows the Present example, and the thin broken line shows the Conventional example. As seen in FIG. 17, the optical sheet of the present invention can obtain the same relative luminance at most view angles and can provide the same performance as the conventional optical sheet.

In the graph of FIG. 17, when the view angle is near 0°, the relative luminance in the Present example is slightly lower than that in the Conventional example. It can be said that a sudden change of the transmittance between near 0° and other view angles is mitigated, a sudden reduction in the transmittance due to a change of the view angle is suppressed, the uniformity of brightness in a screen can be improved, and therefore, the view angle properties of the optical sheet of the present invention rather tends to be enhanced.

The measurement results of the total light transmittance, the diffuse reflectance, and the contrast are shown in table 2.

TABLE 2

| | Total light transmittance (%) | Diffuse reflectance (%) | Contrast (Total light transmittance/ Diffuse reflectance) |
|---|---|---|---|
| Present example | 63 | 7.9 | 7.97 |
| Coventional example | 67 | 8 | 8.38 |

As seen in Table 2, since the total light transmittance is low, the contrast tends to be slightly low. However, there is little difference between the present example and the conventional example and the difference falls within a range without causing a practical problem.

As described above, the optical sheet of the present invention can enhance the productivity while maintaining the performance.

The present invention has been described in connection with what is presently considered the most practical and preferred embodiments. However, the invention is not limited to the embodiments disclosed in the specification of the present application, and it can be suitably changed without departing from the scope or spirit of the invention read from the claims and the entire specification. Accordingly, it should be understood that an optical sheet, an image source unit, a display device, a process for producing an optical sheet, and a method for manufacturing a display device can be modified within a technical range of the invention.

The invention claimed is:

1. A method for manufacturing an optical sheet, comprising the steps of:
    forming, on one surface of a base material as a sheet-shaped member, prisms to be arranged in parallel along the sheet surface of the optical sheet in a manner to transmit light;
    forming light-absorbing parts between the prisms;
    winding, in a roll, a stacked body having the prisms and the light-absorbing parts formed on the base material;
    after formation of the prisms and the light-absorbing parts, while winding back the stacked body that has been wound in a roll, applying an adhesive directly on the other surface of the base material by spraying it through a slit nozzle such that the thickness of the adhesive is uniformed; and winding, in a roll, a stacked body having layers of the base material, the prisms, the light-absorbing parts, and the adhesive.

2. A method for manufacturing a display device, comprising the steps of:
    producing the optical sheet wound in a roll in accordance with the method of claim 1;
    while winding back the optical sheet that has been wound in a roll, punching the optical sheet; and
    disposing the optical sheet on an observer side relative to a plasma display panel.

3. The method for manufacturing the display device according to claim 2, further comprising the step of adhering the adhesive of the optical sheet to the plasma display panel to adhere the optical sheet directly to the plasma display panel.

4. A method for manufacturing an optical sheet, comprising the steps of:
    applying an adhesive directly on one surface of the base material of a sheet-shaped member by spraying it through a slit nozzle such that the thickness of the adhesive is uniformed;
    winding, in a roll, a stacked body having the adhesive formed on the base material; thereafter
    while winding back the stacked body that has been wound in a roll,
    forming, on the other surface relative to the adhesive-applied surface of the base material, prisms to be arranged in parallel along the base material in a manner to transmit light;
    forming light-absorbing parts between the prisms; and winding, in a roll, a stacked body having layers of the base material, the prism, the light-absorbing parts, and the adhesive.

5. A method for manufacturing a display device, which comprises the steps of:
    producing the optical sheet wound in a roll in accordance with the method of claim 4;
    while winding back the optical sheet that has been wound in a roll, punching the optical sheet; and
    disposing the optical sheet on an observer side relative to a plasma display panel.

6. The method for manufacturing a display device according to claim 5, further comprising the step of adhering the adhesive of the optical sheet to the plasma display panel to adhere the optical sheet directly to the plasma display panel.

* * * * *